(12) United States Patent
Hedayat et al.

(10) Patent No.: US 12,192,007 B2
(45) Date of Patent: Jan. 7, 2025

(54) EFFICIENT AND ROBUST ACKNOWLEDGEMENT PROCEDURES FOR NEW RADIO OPERATION IN UNLICENSED BANDS

(71) Applicant: INTERDIGITAL PATENT HOLDINGS, INC., Wilmington, DE (US)

(72) Inventors: Ahmad Reza Hedayat, Aliso Viejo, CA (US); Shahrokh Nayeb Nazar, San Diego, CA (US); Oghenekome Oteri, San Diego, CA (US); Hanqing Lou, Syosset, NY (US); Rui Yang, Greenlawn, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 432 days.

(21) Appl. No.: 17/266,785

(22) PCT Filed: Aug. 8, 2019

(86) PCT No.: PCT/US2019/045620
§ 371 (c)(1),
(2) Date: Feb. 8, 2021

(87) PCT Pub. No.: WO2020/033623
PCT Pub. Date: Feb. 13, 2020

(65) Prior Publication Data
US 2021/0344451 A1   Nov. 4, 2021

Related U.S. Application Data

(60) Provisional application No. 62/753,457, filed on Oct. 31, 2018, provisional application No. 62/716,211, filed on Aug. 8, 2018.

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/0446* (2013.01); *H04W 74/002* (2013.01); *H04W 74/0816* (2013.01)

(58) Field of Classification Search
CPC .............. H04L 1/1819; H04L 1/1896; H04W 72/0446; H04W 74/002; H04W 74/0816
See application file for complete search history.

(56) References Cited

U.S. PATENT DOCUMENTS 10,039,087 B2   7/2018  Nayeb Nazar et al.
10,205,576 B2   2/2019  Ahn et al.
(Continued)

FOREIGN PATENT DOCUMENTS

WO   2016123372 A1   8/2016
WO   2018/064128      4/2018
(Continued)

OTHER PUBLICATIONS

Huawei et al., "HARQ enhancements in NR unlicensed," 3GPP TSG RAN WG1 Meeting #93, R1-1805918, Busan, Korea (May 21-25, 2018).
(Continued)

*Primary Examiner* — Michael Thier
*Assistant Examiner* — Nevena Zecevic Sandhu
(74) *Attorney, Agent, or Firm* — Volpe Koenig

(57) ABSTRACT

Systems, methods, and devices for efficient and robust handling of acknowledgements in new radio unlicensed bands (NR-U) environments. A wireless transmit receive unit (WTRU) may receive control information and a data transmission from a gNB in a first interval (i.e., transport
(Continued)

block or channel occupancy time), wherein the control information may include an indication of uplink resources. The data transmission may require some sort of acknowledgement (i.e., HARQ feedback). The WTRU may attempt to transmit the acknowledgement in the indicated uplink resources, but the gNB may not receive the acknowledgement. The WTRU may receive control information and a data transmission from the gNB in a second interval, including an indication to aggregate any previously unsuccessful acknowledgement transmissions. The WTRU may transmit an aggregated acknowledgement including previous unsuccessful acknowledgements and any additional acknowledgements from the current interval. In some cases, look-before-talk procedures may be used.

16 Claims, 12 Drawing Sheets

(51) Int. Cl.
  *H04W 72/0446* (2023.01)
  *H04W 74/00* (2009.01)
  *H04W 74/0816* (2024.01)

(56) References Cited

U.S. PATENT DOCUMENTS

| | | | |
|---|---|---|---|
| 10,530,524 | B2 | 1/2020 | Kim et al. |
| 10,904,919 | B2 | 1/2021 | Si et al. |
| 11,239,978 | B2 | 2/2022 | Liang et al. |
| 2017/0019915 | A1* | 1/2017 | Nogami ............... H04L 5/0053 |
| 2020/0037280 | A1* | 1/2020 | Enbuske ............... H04L 1/1864 |
| 2021/0006377 | A1* | 1/2021 | Hooli .................... H04L 5/001 |
| 2021/0167900 | A1* | 6/2021 | Karaki .................. H04W 72/23 |
| 2021/0297115 | A1* | 9/2021 | Nam ..................... H04L 5/0023 |
| 2021/0297190 | A1* | 9/2021 | Baldemair ............ H04L 1/1896 |
| 2021/0314107 | A1* | 10/2021 | Yoshioka ............. H04L 1/1819 |

FOREIGN PATENT DOCUMENTS

| | | |
|---|---|---|
| WO | 2018/068025 | 4/2018 |
| WO | 2018/085145 | 5/2018 |
| WO | 2018/129017 | 7/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Discussion on HARQ Procedure in NR-Unlicensed," 3GPP TSG RAN WG1 Meeting #93, R1-1807038, Busan, Korea (May 21-25, 2018).
Interdigital Inc., "HARQ Enhancements for NR-U," 3GPP TSG RAN WG1 Ad-Hoc Meeting 1901, R1-1900788, Taipei, Taiwan (Jan. 21-25, 2019).
Interdigital Inc., "HARQ Enhancements for NR-U," 3GPP TSG RAN WG1 Meeting #95, R1-1813222, Spokane, USA (Nov. 12-16, 2018).
Interdigital Inc., "HARQ Enhancements for NR-U," 3GPP TSG RAN WG1 Meeting #94bis, R1-1811206, Chengdu, China (Oct. 8-12, 2018).
Interdigital Inc., "On HARQ Enhancements for NR-U," 3GPP TSG RAN WG1 Meeting #94, R1-1809091, Gothenburg, Sweden (Aug. 20-24, 2018).
Qualcomm Incorporated, "Enhancements to Scheduling and HARQ operation for NR-U," 3GPP TSG RAN WG1 Meeting #93, R1-1807391, Busan, Korea (May 21-25, 2018).
Third Generation Partnership Project, "Technical Specification Group Radio Access Network; NR; Physical channels and modulation (Release 15)," 3GPP TS 38.211 V2.0.0 (Dec. 2017).
Third Generation Partnership Project, "Technical Specification Group Radio Access Network; NR; Physical channels and modulation (Release 15)," 3GPP TS 38.211 V15.2.0 (Jun. 2018).
Third Generation Partnership Project, "Technical Specification Group Radio Access Network; NR; Physical channels and modulation (Release 15)," 3GPP TS 38.211 V15.6.0 (Jun. 2019).
Third Generation Partnership Project, "Technical Specification Group Radio Access Network; NR; Physical layer procedures for control (Release 15)," 3GPP TS 38.213 V2.0.0 (Dec. 2017).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.2.0 (Jun. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.6.0 (Jun. 2019).
Interdigital Inc., "Harq timing and management," 3GPP TSG RAN WG1 NR, RAN1#90bis, R1-1718362, Prague, Czech Republic (Oct. 9-13, 2017).
Nokia et al., "HARQ enhancements for NR unlicensed," 3GPP TSG RAN WG1 Meeting #93, R1-1806110, Busan, Korea (May 21-25, 2018).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.2.1 (Jun. 2018).

(56) References Cited

OTHER PUBLICATIONS

Third Generation Partnership Project, "Technical Specification Group Radio Access Network; NR; Radio Resource Control (RRC) protocol specification (Release 15)," 3GPP TS 38.331 V15.6.0 (Jun. 2019).

* cited by examiner

US 12,192,007 B2

EFFICIENT AND ROBUST ACKNOWLEDGEMENT PROCEDURES FOR NEW RADIO OPERATION IN UNLICENSED BANDS

CLAIM FOR PRIORITY

This application is the U.S. National Stage, under 35 U.S.C. § 371, of International Application No. PCT/US2019/045620, filed Aug. 8, 2019, which claims the benefit of U.S. Provisional Application No. 62/716,211, filed Aug. 8, 2018, and U.S. Provisional Application No. 62/753,457, filed Oct. 31, 2018, the contents of which are incorporated herein by reference.

BACKGROUND

In the field of wireless communication, next generation air interfaces such as New Radio may support a wide range of use cases with varying spectrum usage models such as licensed, unlicensed/shared, and the like. In order to operate in shared spectrum, there may need to be systems, methods, and devices that achieve efficient and robust wireless communication in unlicensed bands.

SUMMARY

Systems, methods, and devices for efficient and robust handling of acknowledgements in new radio unlicensed bands (NR-U) environments. A wireless transmit receive unit (WTRU) may receive control information and a data transmission from a gNB in a first interval (i.e., transport block or channel occupancy time), wherein the control information may include an indication of uplink resources. The data transmission may require some sort of acknowledgement (i.e., HARQ feedback). The WTRU may attempt to transmit the acknowledgement in the indicated uplink resources, but the gNB may not receive the acknowledgement. The WTRU may receive control information and a data transmission from the gNB in a second interval, including an indication to aggregate any previously unsuccessful acknowledgement transmissions. The WTRU may transmit an aggregated acknowledgement including previous unsuccessful acknowledgements and any additional acknowledgements from the current interval. In some cases, look-before-talk procedures may be used.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
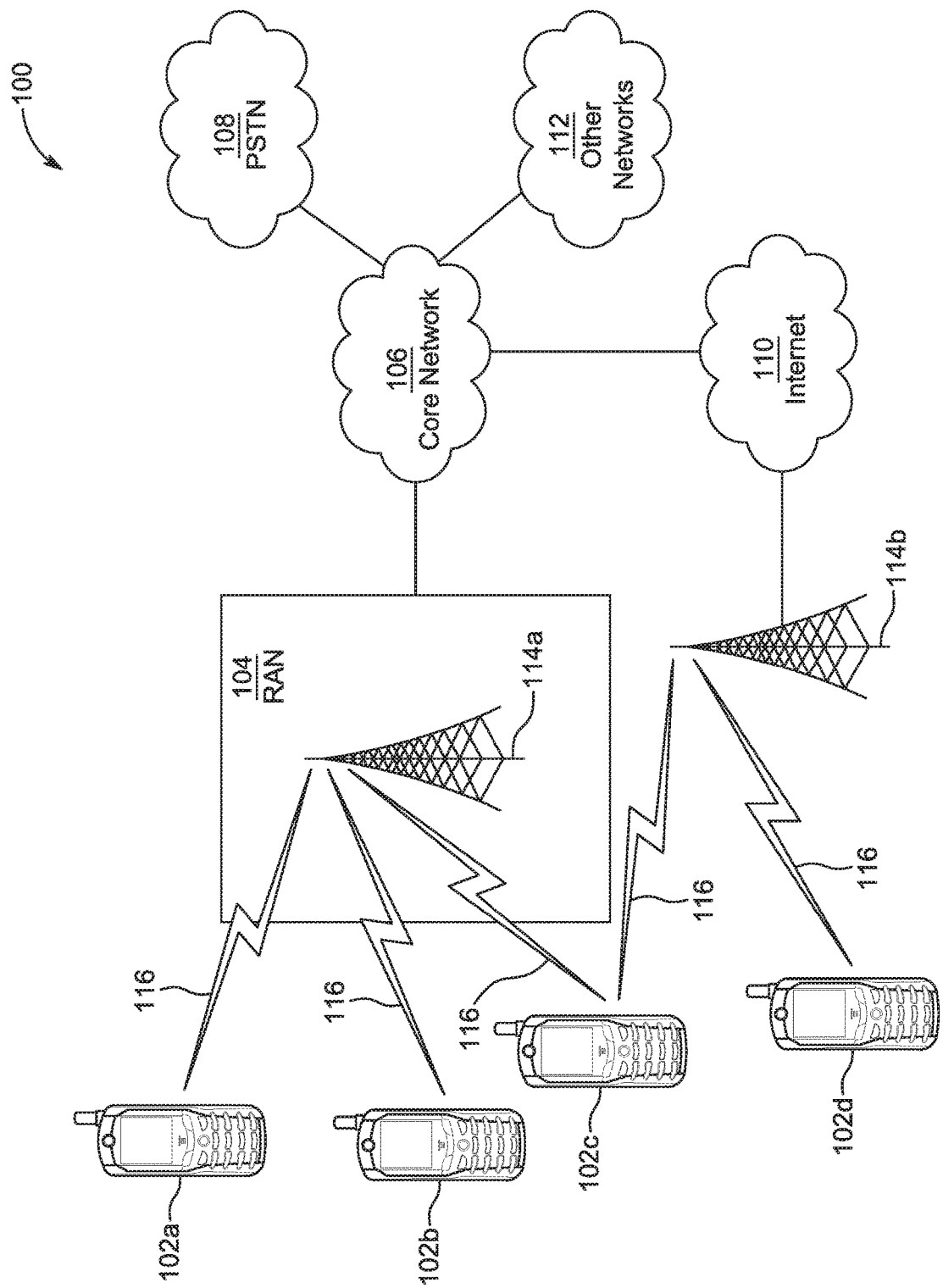
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU/UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as New Radio (NR) Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (Vol P) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
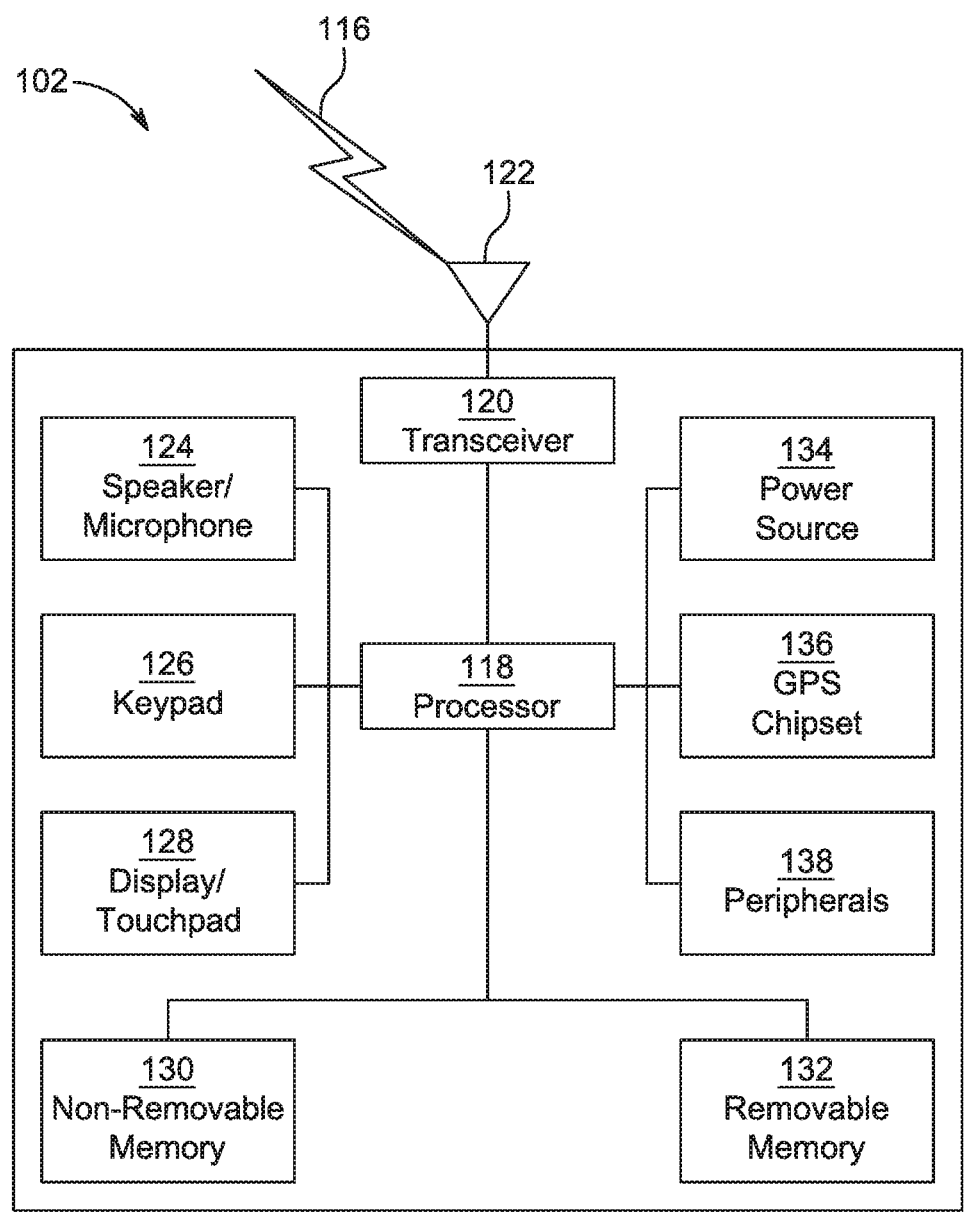
FIG. 1B is a system diagram illustrating an example wireless transmit/receive unit (WTRU) that may be used within the communications system illustrated in FIG. 1A according to an embodiment.
Figure 1C:
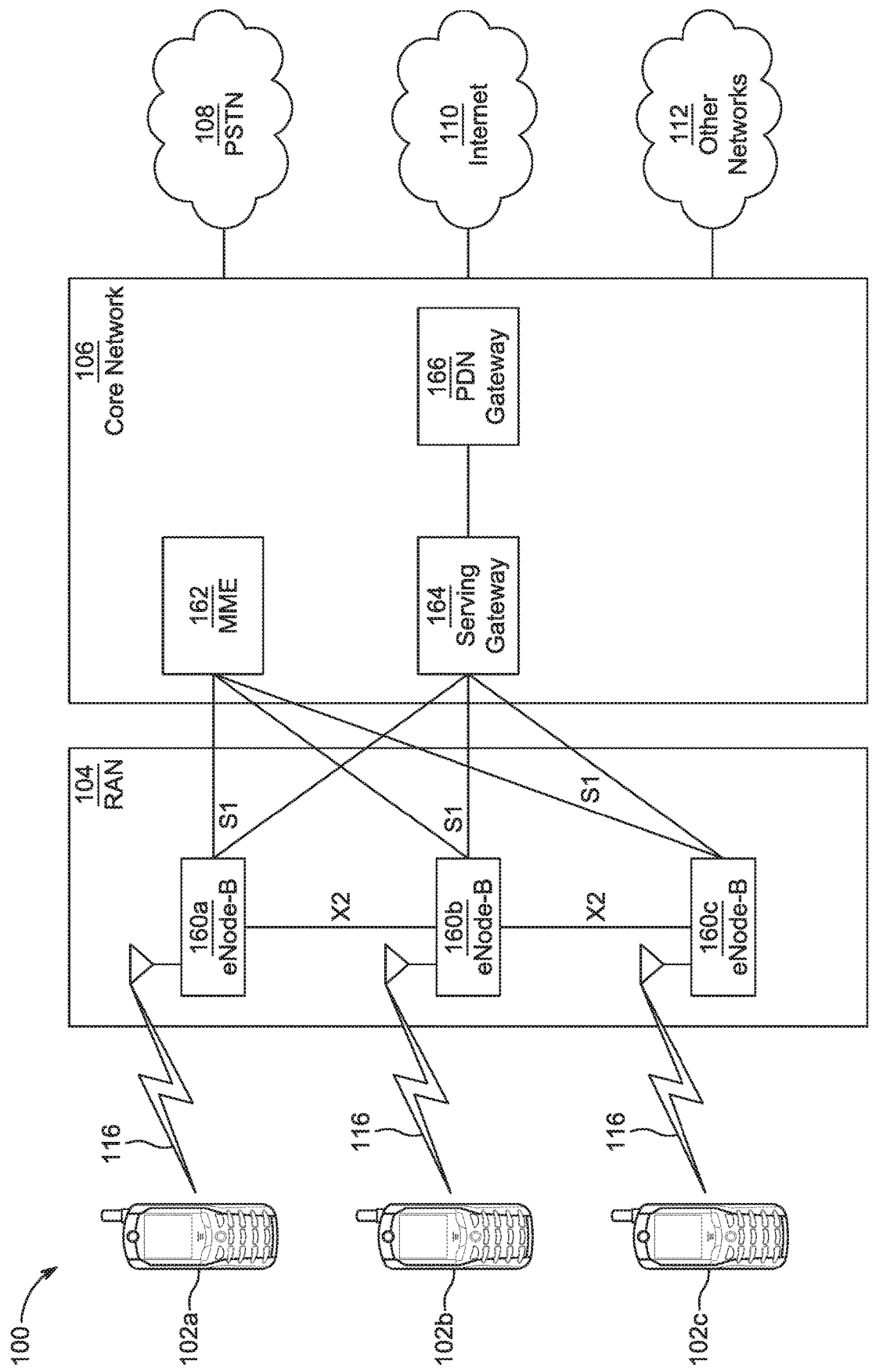
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
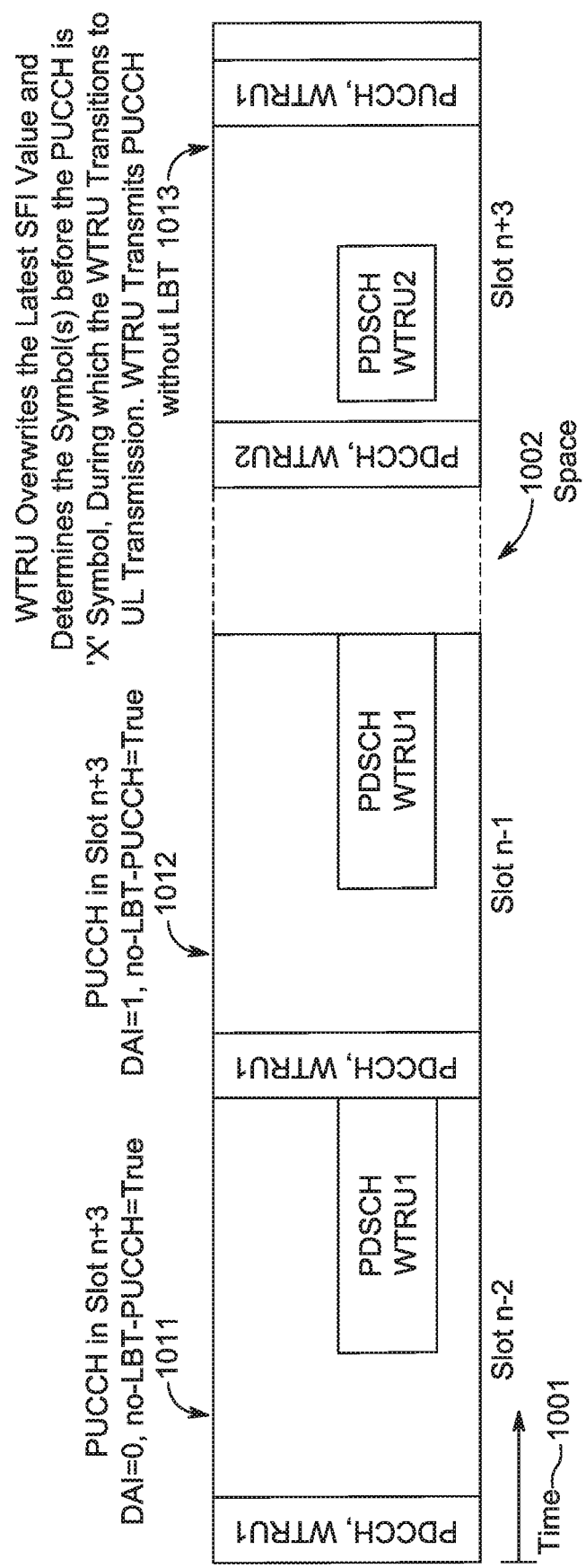
FIG. 10 is an example transmission diagram where the WTRU inspects attributes of a scheduled PUCCH to determine a no gap transmission.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
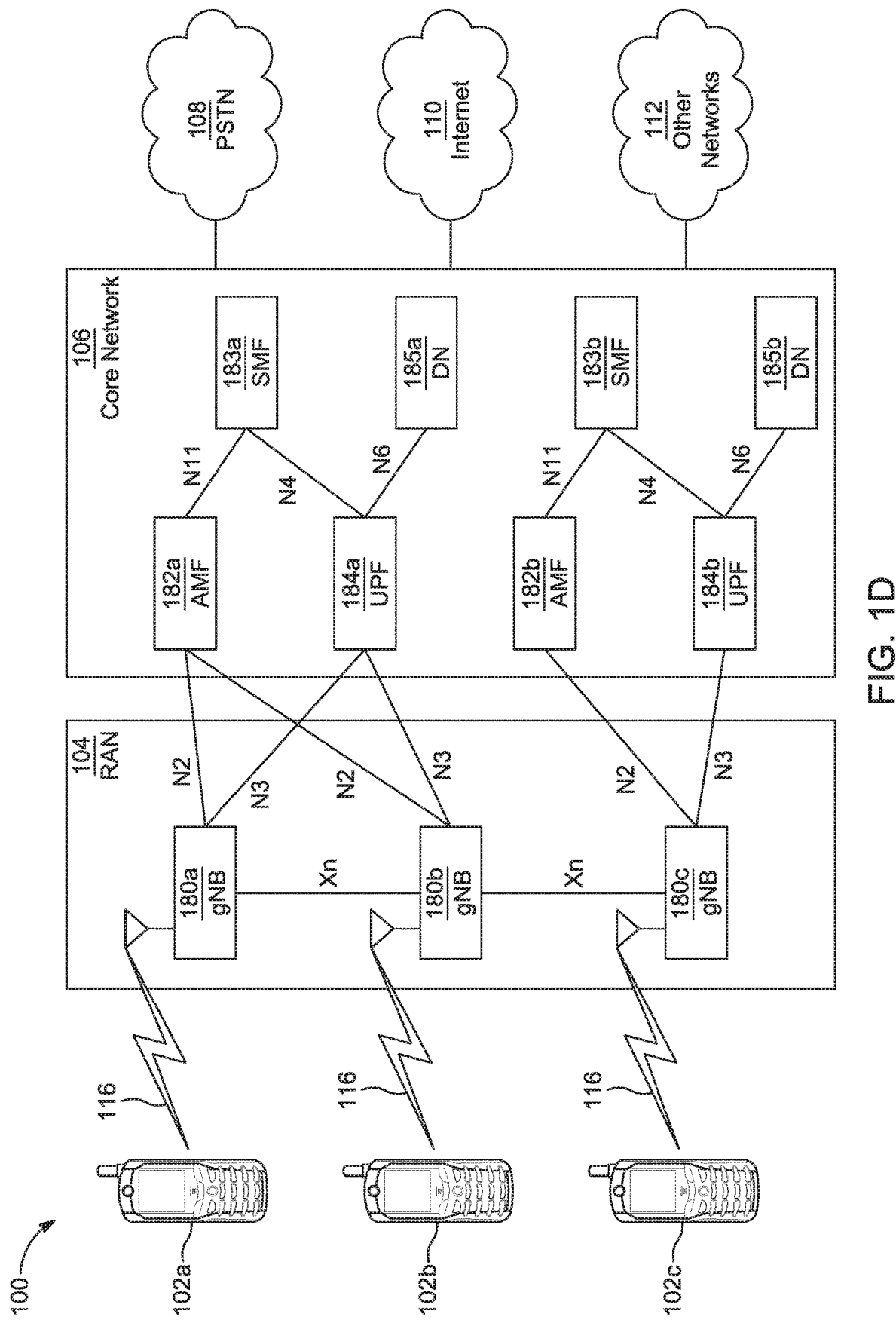
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In wireless systems, such as those relating to FIGS. 1A-1D described herein, a central node (e.g., gNB) may serve a set of WTRUs, and opportunity(ies) to send transport blocks (TB) from the WTRUs to the central node may be administered by the central node. For instance, a gNB may schedule individual WTRU uplink (UL) transmission by assigning separate time-frequency resources to each WTRU and granting each resource to one WTRU. Such an arrangement for UL transmission is sometimes referred to as grant-based UL transmission. Alternatively, a gNB may announce the presence of one or more time-frequency resources and allow a set of WTRUs to use each resource, thereby allowing access without a specific UL grant.

In some cases, unlicensed bands may be used, either exclusively or in part, in a wireless system where a base station (e.g., gNB) or a WTRU need to perform a listen-before-talk (LBT) procedure before accessing the unlicensed wireless channel in order to ensure fair channel access. Depending on the regulatory requirements of the unlicensed channel, the LBT specifics may be different. In general, a LBT procedure may comprise of a fixed and/or random duration interval where a wireless node (e.g., a gNB or a WTRU) listens to a medium and if the energy level detected from the medium is more than a threshold (that is specified by the regulator) the gNB or WTRU refrains from transmitting any wireless signal; otherwise the wireless node may transmit its desired signal after the duration (i.e., completion of the LBT procedure). An LBT duration interval is the time spent detection/sensing before transmission, which means a longer LBT duration interval means a longer time to wait for transmission.

Generally, NR technologies may be appropriate for many use cases, such as ultra-reliable low-latency communication (URLLC), massive machine-type communication (mMTC or MMTC), or enhanced mobile broadband (eMBB or EMBB) communication. MMTC may enable communication between devices that are low-cost, massive in number and battery-driven, intended to support applications such as smart metering, logistics, and field and body sensors. URLLC may make it possible for devices and machines to communicate with ultra-reliability, very low latency and high availability, for applications such as vehicular communication, industrial control, factory automation, remote surgery, smart grids and public safety applications. EMBB may address enhancements to a variety of parameters such as data rate, delay and coverage of mobile broadband access. In order to meet the performance requirements of these use cases, NR may have specific parameters and capabilities.

NR may specify various numerologies with subcarrier spacing ranging from 15 KHz to 240 KHz. The base subcarrier spacing may be 15 KHz and other numerologies may have an increasing subcarrier spacing with a multiplication of a power of two the base subcarrier spacing as listed in Table 1.

TABLE 1

NR Numerologies

| $\mu$ | $\Delta f = 2^\mu \cdot 15$ [kHz] | OFDM Symbol Duration (us) | OFDM Symbol including CP (us) |
|---|---|---|---|
| 0 | 15 | 66.67 | 71.35 |
| 1 | 30 | 33.33 | 35.68 |
| 2 | 60 | 16.67 | 17.84 |
| 3 | 120 | 8.33 | 8.92 |
| 4 | 240 | 4.17 | 4.46 |

A Physical Downlink Control Channel (PDCCH) in NR may comprise of one or more control-channel elements (CCEs); up to 16 CCEs depending on an aggregation level. A control-resource set (CORESET) may comprise of $N_{RB}^{CORESET}$ resource blocks in the frequency domain, given by the higher-layer parameter CORESET-freq-dom, and $N_{symb}^{CORESET} \in \{1,2,3\}$ symbols in the time domain, given by the higher-layer parameter CORESET-time-dur. Some relevant parameters to PDCCH may be: group-common (GC) PDCCH, RRC-configured; common PDCCH, system info and paging for all WTRUs; remaining system info (RMSI), configured by PBCH; other systems info (OSI), configured by PBCH.

The Physical Uplink Control Channel (PUCCH) in NR may support multiple formats as shown in Table 2.

TABLE 2

PUCCH formats

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

In a NR frame, OFDM symbols in a slot may be classified as 'downlink' (denoted D'), 'flexible' (denoted 'X'), or 'uplink' (denoted 'U'). This structure is shown in Table 3.

TABLE 3

Various formats of NR slots

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | ... | v | | | | | | | | | | | | |
| 60 | D | X | X | X | X | X | U | D | X | X | X | X | X | U |
| 61 | D | D | X | X | X | X | U | D | D | X | X | X | X | U |
| 62-255 | Reserved | | | | | | | | | | | | | |

In some regulatory regimes, Listen Before Talk (LBT) procedures may be mandatory for unlicensed channel usage, and as a consequence there may be LBT categories for protocols such as Licensed Assisted Access (LAA), Enhanced LAA (eLAA), and Further eLAA (feLAA). The LBT Category 4 (CAT 4) scheme, adopted in LAA/eLAA, may be a preferred scheme for some use cases. The LBT CAT 4 procedure starts when an eNB or gNB, and in some cases a WTRU, wants to transmit control or data in an unlicensed channel. The device then may conduct an initial clear channel assessment (CCA), where the channel is checked to be idle for a period of time (i.e., that is a sum of a fixed period of time and a pseudo-random duration). The availability of the channel may then be determined by comparing the level of energy detected (ED) across the bandwidth of the unlicensed channel to an energy threshold that is determined by the regulator.

If the channel is determined to be free, the transmission may proceed. If not, the device conducts a slotted random back-off procedure, where a random number may be selected from a specified interval called the contention window. A back-off countdown may be obtained and the channel is verified to be idle, and the transmission may then be initiated when the back-off counter goes to zero. After the eNB or gNB has gained access to the channel, it may be allowed to transmit for a duration referred to as a channel occupancy time (COT), but only for a limited duration referred to as the maximum channel occupancy time (MCOT). The CAT 4 LBT procedure with random backoff and variable contention window sizes may enable fair channel access and good coexistence with other Radio Access Technologies (RATs), such as Wi-Fi and other LAA networks. The following are examples of LBT categories: Category 1 No listen interval; Category 2 Fixed duration listen interval (e.g., 25 µs); Category 3 Random duration listen interval with fixed contention window; and Category 4 Random duration listen interval with increasing contention window.

In Category 3 LBT, the transmitter may draw a random number N within a contention window. The size of the contention window may be specified by the minimum and maximum value of N. The size of the contention window may be fixed. The random number N may be used in the LBT procedure to determine the duration of time that the channel is sensed to be idle before the transmitting entity transmits on the channel.

In Category 4 LBT, the transmitter may draw a random number N within a contention window. The size of the contention window may be specified by the minimum and maximum value of N. The transmitting entity may vary the size of the contention window when drawing the random number N. The random number N may be used in the LBT procedure to determine the duration of time that the channel may be sensed to be idle before the transmitting entity transmits on the channel.

As discussed herein, a carrier bandwidth part (BWP) may be a contiguous set of physical resource blocks, selected from a contiguous subset of the common resource blocks for a given numerology on a given carrier.

A WTRU may be configured with up to four carrier BWPs in the downlink with a single downlink carrier BWP being active at a given time. The WTRU may not be expected to receive PDSCH, PDCCH, CSI-RS, or TRS outside an active BWP. A WTRU may be configured with up to four carrier BWPs in the uplink with a single uplink carrier BWP being active at a given time. If a WTRU is configured with a supplementary uplink, the WTRU may additionally be configured with up to four carrier BWPs in the supplementary uplink with a single supplementary uplink carrier BWP being active at a given time. The WTRU may not transmit a PUSCH or PUCCH outside an active BWP.

For HARQ operation in NR, there may be a flexible HARQ feedback timing indicated by a 3-bit PDSCH-to-HARQ-timing indicator field. There may be a one-to-one mapping between the PDSCH and the corresponding feedback on PUCCH/UCI. The slot timing between the PDSCH and the PUCCH, referred to as K1, may be indicated in a 3-bit field in DCI, indexing eight RRC-configured values. In DCI Format 1-1 these eight values may be mapped to the delay values that are RRC-configured (i.e., the mapping is {000, . . . , 111}→RRC-defined-values). In DCI Format 1-0, these eight values are mapped to the set of delay {1, 2, . . . , 8}.

NR may support small processing delays, but not as small as providing feedback within the same slot (e.g., for capability 1 WTRUs). For instance, with a subcarrier spacing of 30 KHz, L1 processing delay from the end of the PDSCH until the beginning of the PUCCH may be a minimum of 10 OFDM symbols. N1 may be the number of OFDM symbols from the end of PDSCH until the beginning of PUCCH. Front-loaded DMRS only may be 10 and 17 symbols for SCS=30 kHz and 60 kHz and front-loaded+additional DMRS may be 13 and 20 symbols for SCS=30 kHz and 60 kHz. N2 may be the number of OFDM symbols from the end of PDCCH (i.e., UL grant) until the beginning of PUSCH. Freq.-first RE-mapping may be 12 and 23 symbols for SCS=30 kHz and 60 kHz.

NR may support dynamic indication of PUCCH resource and time, and HARQ feedback for multiple PDSCHs may be sent using a single HARQ codebook. PUCCH resource and time may be indicated in the scheduling DCI in the case of a dynamically scheduled transmission. The association between PDSCH and PUCCH may be based on the PUCCH resource and time indicated in the scheduling DCI; HARQ feedback of all PDSCHs where scheduling DCIs indicate the same PUCCH resource and time may be reported together. The latest PDSCH feedback that can be included may be limited by the processing time the WTRU needs to prepare HARQ feedback.

NR may aggregate feedback of multiple HARQ processes in one PUCCH using semi-static or dynamic codebooks.

For semi-static NR feedback aggregation, the ACK codebook size may be determined based on the maximum number of TBs across cells and the PDCCH monitoring occasions in time that can be configured to have ACK on the same slot. This mode may be more robust to missed and false DCI detections than a dynamic mode, but may come at the expense of more bits for ACK feedback. For example, with 8 CBGs and 16 HARQ processes, 128 bits per cell are transmitted to signal HARQ feedback even for single TB.

For dynamic NR feedback aggregation, the set of HARQ processes may be dynamically determined for each HARQ process where a feedback should be reported. In general, the HARQ codebook size may be determined based on the content of a number of consecutively received DCIs, based on which a gNB conveys the codebook attributes to a WTRU efficiently. A downlink assignment indicator (DAI, 2-bit) may indicate the number of HARQ process that should be reported; the DAI may make it robust to missed/false DCI. To index the HARQ codebook the DCI of each scheduling assignment may contain a DAI that counts all previous DL assignments, including the current one, which may be included in the HARQ codebook. The DAI contained in the DCI of the latest DL assignment may determine the HARQ codebook size. Even if the WTRU misses some DL assignments it may still address the HARQ codebook correctly, as long as the DAI does not wrap around. DAI in the DL scheduling DCI may be stepped by one as compared to the immediate preceding DL scheduling DCI; if the difference is higher than 1, it may be an indication a PDCCH has been missed.

There may be one or more HARQ procedure(s) of grant free UL transmission in NR. The grant free (GF) UL transmission, also known as a configured grant, and the associated HARQ procedure may have several types and attributes in NR. Type I may only be via RRC configuration, where WTRUs are configured to access the GF resources. Type II may be with RRC configuration and DCI signaling, where WTRUs are configured to access the GF resources, and the access to GF resources is activated, deactivated, or reactivated with DCI signaling. The GF UL transmission may be configured to take place as slot-based or mini-slot-based.

One attribute of the HARQ procedures may where acknowledgment, HARQ feedback, and retransmission is done as follows: grant-based retransmission of a TB after a failure of the GF transmission; and, grant-free transmission of a TB with up to K=8 repetitions, across consecutive GF resources, with early termination if an implicit acknowledgment indication is received by the WTRU.

An implicit HARQ attribute may be that there is no explicit HARQ-ACK feedback, and that it may be implicit using the NDI field in a DCI format that explicitly indicates the UL HARQ process ID. Also, an implicit HARQ attribute may be where the HARQ ID is from a selected resource, where the HARQ Process ID may equal the floor (X/UL-TWG-periodicity) mod UL-TWG-numbHARQproc, where X=(SFN*SlotPerFrame*SymbolPerSlot+ Slot_index_In_SF*SymbolPerSlot+Symbol_Index_ In_Slot), and X is symbol index of the start of repetition bundle. Also, an implicit HARQ attribute may be a HARQ RV sequence which is determined by the RRC configuration (including RV cycling and RV0 repetition).

HARQ may also be periodic, with multiple TX opportunities for repetition in each period. Further, HARQ TX opportunities may be tied to certain RV order, such as {0,2,3,1}, {0,3,0,3}, and {0,0,0,0} may be supported. The Initial TX of a repetition may start with RV0, but its timing may be flexible otherwise.

In an unlicensed NR (NR-U) environment, when an NR-U device attempts to access an unlicensed channel, it may compete with inter-RAT devices as well as intra-RAT devices for channel access. The type and density of inter-RAT devices may depend on the unlicensed channel and the RAT may be Wi-Fi, LTE LAA, Bluetooth, or the like. The intra-RAT devices may be other NR-U devices (e.g., WTRU or gNB). For instance, for an NR-U WTRU, an intra-RAT device may be other NR-U WTRUs that are connected to the same gNB or it may be a NR-U gNB or WTRUs that are not associated with the same gNB. In attempting to access an unlicensed channel, an NR-U WTRU or gNB may need to have fair competition and coexistence with inter-RAT and intra-RAT devices.

In order to ensure fair competition and coexistence, in some regulatory domains it may be required (i.e., rule) that when a wireless node wants to access an unlicensed channel the node may need to first perform a listen-before-talk (LBT) procedure for a duration of time and if no energy beyond a threshold is detected then the wireless node may be allowed to transmit into the wireless channel for up to a maximum duration. Therefore, for an NR-U node a similar LBT procedure may be expected.

Figure 2:
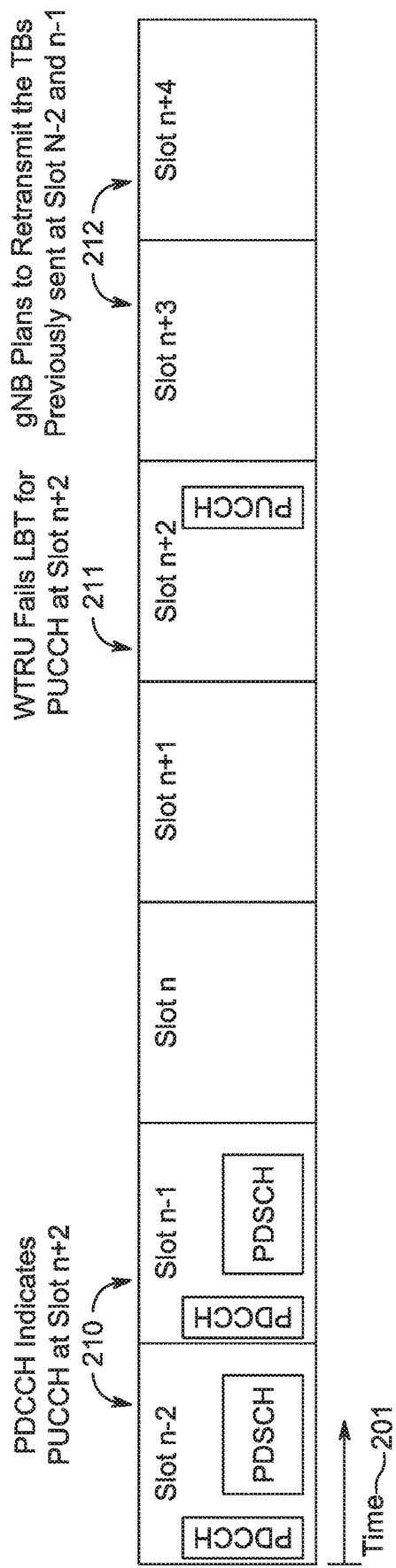
FIG. 2 is an example transmission diagram where a WTRU fails a LBT procedure.

FIG. 2 is an example transmission diagram where a WTRU fails to complete a LBT successfully. As discussed herein, for any transmission diagram, time 201 may be indicated in the horizontal axis, with the transmission having a number of time units (e.g., slots). The slots may be labeled relative to a slot n in time. In this example, at 210 a WTRU may receive a DL of a PDCCH in slot n−2 and slot n−1, which may indicate UL resources of a PUCCH in slot n+2. At 211, the WTRU may fail to complete a LBT successfully for the scheduled PUCCH at slot n+2 and therefore may need to refrain from transmitting the HARQ codebook that had been prepared for the TBs carried in slots n−2 and n−1. It follows that the WTRU in this case may have to refrain from transmission even if the transmission has a timing dependency that could affect the receiving entity. For instance, if a WTRU is to transmit a PUCCH that consists of a HARQ codebook and the LBT fails, the WTRU may have to refrain from transmitting it. at 212, the NR gNB may assume that the related TBs, in the preceding PDSCH for which the WTRU has prepared a HARQ codebook to transmit, were not received correctly by the WTRU and the gNB may need to retransmit them in the next transmission (e.g., next slot n−2 and n−1).

FIG. 2 shows that in some cases a NR-U gNB may not receive the HARQ codebook, due to the WTRU failing the LBT process for the scheduled PUCCH resource. One approach to this issue may be to allow multiple opportunities for PUCCH transmission (e.g., announced in the DCI).

Figure 3:
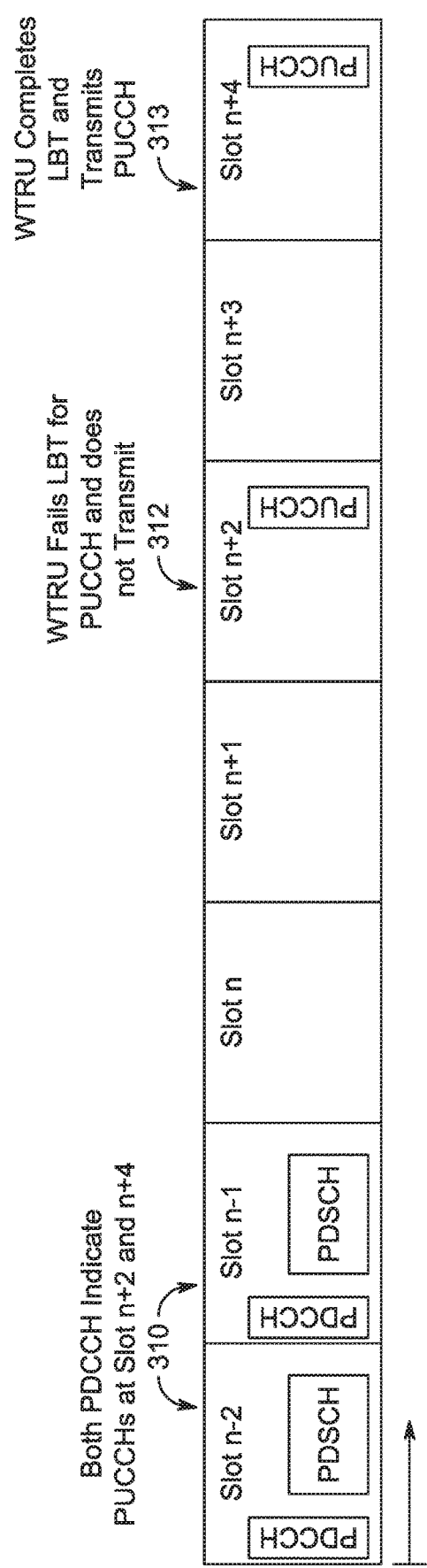
FIG. 3 is an example transmission diagram where a WTRU fails a LBT procedure.

FIG. 3 is an example transmission diagram where a WTRU may have more than one opportunity for PUCCH. Time 301 is indicated in the horizontal axis, with a number of time units, such as slots. The slots are labeled relative to a slot n in time. In this example, at 310 a WTRU may receive a DL of a PDCCH (i.e., in slot n−2 and slot n−1), which may indicate PUCCH at slot n+2 and slot n+4. At 311, the WTRU may attempt to transmit in the first indicated opportunity of slot n+2, but fail the LBT and therefore have to wait until the next opportunity (i.e., slot n+4). At 313, the WTRU attempts again and successfully completes the LBT in slot n+4 and transmits on the PUCCH.

Generally, multiple opportunities of resources may be scheduled across a number of slots, spread in time, or they could be scheduled in the same one or two consecutive slots but each within a different 20 MHz BWP (i.e., each within a different 20 MHz unlicensed channel). Therefore, the PDSCH-to-HARQ-timing-indicator field that is scalar in NR may carry multiple values. The WTRU may choose the first slot if LBT succeeds, otherwise proceed to the next opportunity and so on. In the example of FIG. 3, the WTRU fails to complete LBT successfully for the first scheduled PUCCH at slot n+2, and waits for the second scheduled PUCCH at slot n+4 where it completes LBT successfully and transmits the HARQ codebook that had been prepared for the TBs (i.e., PDSCH) carried in slots n−2 and n−1. The scheduled set of PUCCHs may be indicated in a set of PDSCH-to-HARQ-timing-indicator.

The multiple opportunities approach, however, may have drawbacks. The chance of LBT success in the next opportunity (e.g., in slot n+4 in FIG. 3) when LBT has failed in the first opportunity (e.g., in slot n+2 in FIG. 3) may be referred to as channel occupancy coherence time (COOT) and may depend on how many inter-RAT and intra-RAT devices operate in the unlicensed channel and what type of traffic each participate in. For instance, if most of the traffic of the active unlicensed devices in the band is video traffic then the COOT may be large, and the chance of a successful LBT after a failed LBT may be large only if the second LBT observation is long after the first one. If the COOT is large, then scheduling multiple PUCCH resources within the same COT may not be effective, which may have a duration of less than 5 ms or 10 ms, depending on the category for which COT is established. Assigning multiple PUCCH opportunities for each WTRU may be wasteful since the gNB has to assign multiple PUCCH resources (i.e., it may double or triple the number of resources used for PUCCH).

Further, if the WTRU fails to transmit a PUCCH within the window of opportunity, where LBT has failed on several PUCCH resources, the gNB may still not have the flexibility to request the feedback at a later time. It may be possible in HARQ in NR-U to first stick with the NR procedure where only one slot for PUCCH transmission is indicated in each PDCCH. However, if the gNB does not receive the expected PUCCH, the gNB may provide a supplementary transmission opportunity, or opportunities, for the PUCCH so that the WTRU has another chance to transmit the previously not-sent HARQ feedback and possibly with additional HARQ feedbacks (i.e., more than one slot for PUCCH transmission may be indicated). Additionally, even if the WTRU completes LBT and sends the HARQ feedback, the gNB might not have detected it correctly due to interference or collision, which could lead to a misalignment between the gNB and the WTRU.

Efficient resource scheduling of PUCCH transmissions in NR-U situations may address these issues. WTRUs may be assigned exclusive resources that are assigned to each WTRU and non-exclusive resources that are shared among multiple WTRUs, in order to reduce the overhead. The non-exclusive resources may be assigned in a manner that reduces the probability of collisions between the WTRUs. To implement this, a few exclusive PDSCH-to-HARQ-timing-indicators may be assigned to each WTRU, and one or more non-exclusive PDSCH-to-HARQ-timing-indicator, which would be shared among multiple WTRUs. The gNB may prioritize the WTRUs that use the non-exclusive PDSCH-to-HARQ-timing-indicators.

To implement the prioritization of some WTRUs for managing non-exclusive resources a PDSCH-to-HARQ timing indicator may include a priority parameter (e.g., the channel access priority class that determines the priority with which the WTRU accesses the medium to transmit its HARQ feedback). The gNB may explicitly assign a priority parameter to the WTRU for a specific non-exclusive resource. This may be assigned statically (i.e., by RRC configuration), semi-statically (i.e., by a combination of RRC configuration and DCI), or dynamically (i.e., by the DCI).

In another approach, a WTRU may autonomously select its access priority class for a specific non-exclusive resource. For example, a WTRU may select the priority parameter based on the number of non-exclusive resource failures it may have experienced. Alternatively, the WTRU may select the priority parameter based on the number of exclusive and non-exclusive resources it is assigned. For this, it may be assumed that a WTRU with N=N1+N2 HARQ resources, where N1 represents the exclusive resources and N2 represents the non-exclusive resources. In an example, the access priority class for N2 may be fixed and depend on the WTRU or the traffic type. In another example, the access priority class may change with the increase of N2 (e.g., N2, 1>=N2, 1>=N2,3 where N2,x is the $x^{th}$ N2 resource). In another example, the access priority class may depend on the value of N1 and N2, such as where a WTRU with N1=3 and N2=1 may have a lower priority than a WTRU with N1=1 and N3=3.

Figure 4:
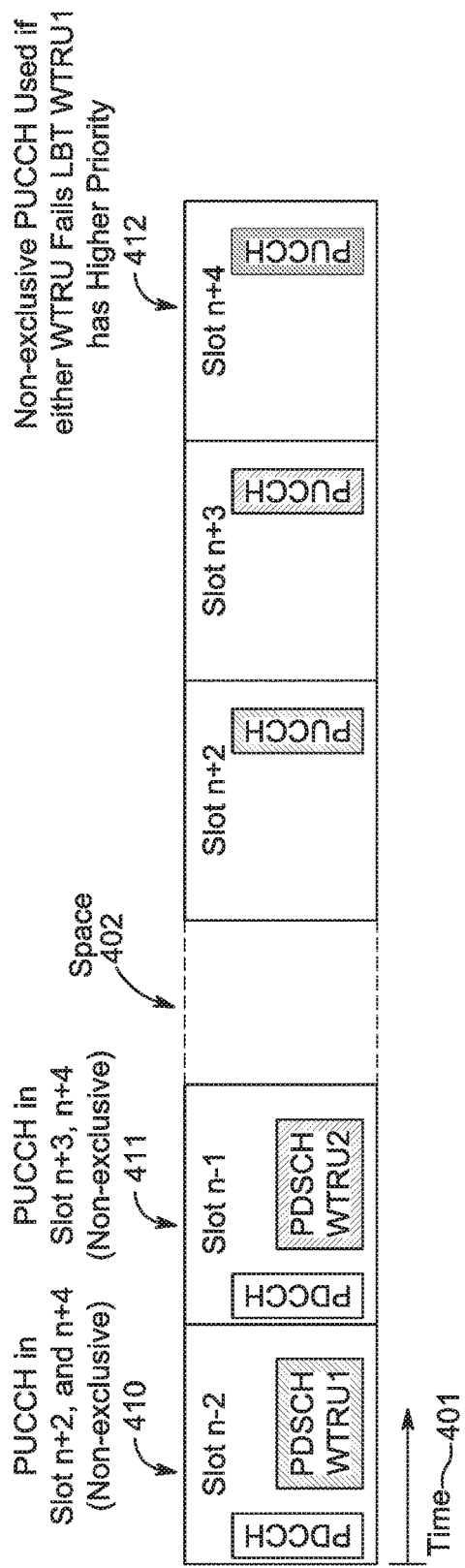
FIG. 4 is an example transmission diagram where a WTRU may have prioritization for a non-exclusive PUCCH.

FIG. 4 is an example transmission diagram where a WTRU may have prioritization for a non-exclusive PUCCH. Time 401 is shown on the horizontal axis, and may be broken up into time increments (e.g., slots) relative to some n increment. In any of the figures discussed herein, a "Space" may refer to a break in the diagram purely for demonstration purposes and is not intended to indicate missing or non-sequential time increments, but merely to save space in the illustrated example. Further, a Space may be the same or similar to the slot before or after the Space, unless otherwise stated.

In the example of FIG. 4, at 410 the WTRU 1 may receive a PDCCH in slot n−2 with an indication of an exclusive PUCCH resource in slot n+2, and an indication for a non-exclusive PUCCH slot in slot n+4 with a priority parameter of 1. The WTRU 1 may receive a PDSCH in slot n−2 and may decode it, which it may need to send HARQ feedback for. At 411, the WTRU 2 may receive a PDCCH in slot n−1 with an indication of an exclusive PUCCH resource in slot n+3, and an indication for a non-exclusive PUCCH slot in slot n+4 with a priority parameter 2. In this example the WTRU 2 may have a lower priority than WTRU 1. The WTRU 2 may receive a PDSCH in slot n−1 and may decode it, which it may need to send HARQ feedback for.

For purposes of this example, it may be assumed that the gNB did not receive the transmissions from either WTRU 1 or WTRU 2 in their assigned PUCCH (i.e., at slot n+2 or n+3, respectively). For instance, at slot n−2, the WTRU 1 may have performed an LBT to transmit in the PUCCH where it failed, and therefore WTRU 1 would not have been able to send the transmission in the PUCCH and would have to wait until slot n+4. Similarly, at slot n+3, the WTRU 2 may have performed an LBT that fails, and WTRU 2 would have to wait until slot n+4.

As a result of the failed first PUCCH attempt for both WTRUs, at 412, WTRU 1 and WTRU 2 may compete for the PUCCH resource in slot n+4, with the LBT duration of WTRU 2 set to a value that is statistically longer than that of WTRU 1, which thereby increases the probability that WTRU 1 will acquire the resource for transmission (i.e., WTRU1 has a higher priority) because it has a shorter time to wait before it transmits according to the LBT procedure. Since WTRU 1 has priority, it may be able to successfully transmit its HARQ feedback.

In some cases, due to collision/interference at the gNB side, the gNB may not be able to detect the HARQ feedback sent by a WTRU. The reason why the gNB cannot receive the transmission, such as failed LBT or missed UCI transmissions, may not be distinguished at the gNB side. Due to the time association between PDSCH and corresponding feedback, if the gNB fails to detect the feedback in the predefined time location, the gNB may subsequently retransmit all the corresponding PDSCHs. While this may happen in NR operation in licensed channels, in NR-U it may happen more often due to highly fluctuating interference and possible collision at the gNB side due to hidden nodes and the like (e.g., not detectable at the WTRU side). This could cause a misalignment between the gNB and WTRU regarding which preceding PDSCH the HARQ codebook has been received successfully by the gNB, which may risk the WTRU flushing the HARQ codebook prematurely.

Figure 5:
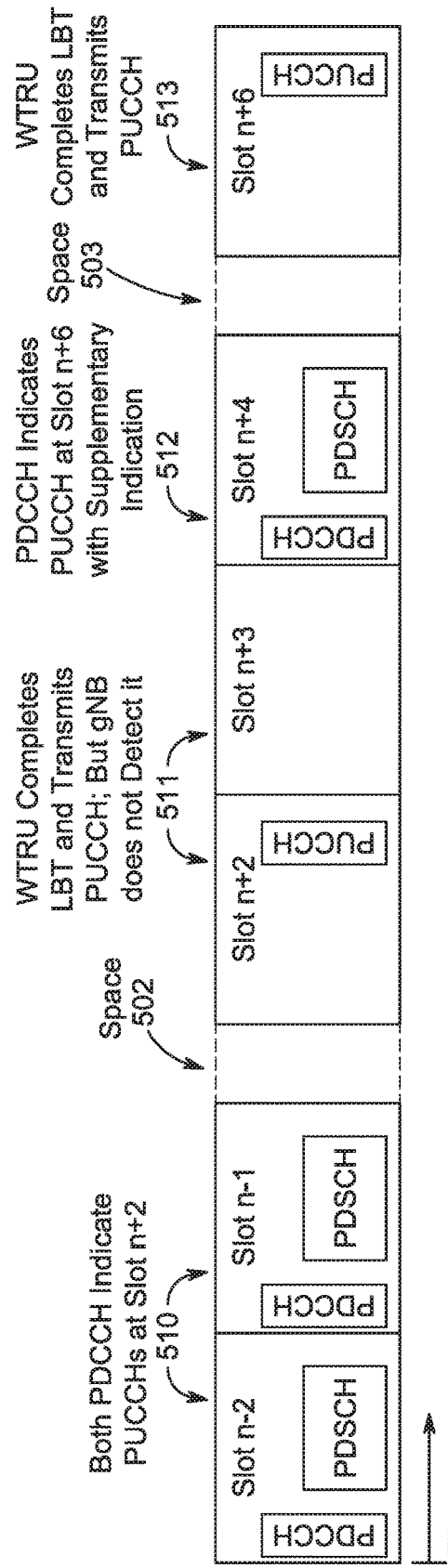
FIG. 5 is an example transmission diagram where a WTRU completes LBT successfully but the gNB fails to detect the PUCCH.

FIG. 5 is an example transmission diagram where a WTRU completes LBT successfully but the gNB fails to detect a PUCCH. Time may be shown in the horizontal axis 501 in increments of slots. At 510, a WTRU may receive an indication in slot n−2 and n−1 for a PUCCH at slot n+2 and may also receive and decode a PDSCH in each slot. At 511, the WTRU may complete a LBT successfully for the scheduled PUCCH at slot n+2 and transmit HARQ feedback, but the gNB may fail to detect the transmission due to interference or error on the receiving end. At 512, the gNB may send in slot n+4, the next PDCCH to the WTRU that indicates the scheduled PUCCH at slot n+6 is a supplementary PUCCH, which may include an indication to the WTRU to send in a PUCCH in slot n+6 the HARQ codebook for the previously scheduled PUCCH which was supposed to have been received in slot n+2, in addition to any codebook that is associated with PDSCH for slot n+4. At 513, the WTRU may successfully complete a LBT and send the PUCCH in the supplementary assigned resource in slot n+6 with all HARQ codebooks.

Unlike the example of FIG. 5, this issue of the gNB not receiving an expected PUCCH may occur in consecutive attempts, such as across a single a channel occupancy time (COT) or across two COTs, or the like. For example, a gNB may not have received an expected PUCCH, which carries a HARQ codebook with respect to a first set of PDSCH resources and the gNB may give a first supplemental PUCCH resource for the HARQ codebook transmission, but until the time of the supplemental resource the gNB may keep scheduling more PDSCHs (i.e., a second set of PDSCH resources) for the WTRU; hence, there may be additional HARQ feedback, or additional HARQ codebook, on top of the previous HARQ codebook(s). The WTRU and gNB may need to have the same understanding for how many and what HARQ codebooks need to be transmitted by the WTRU, and such a common understanding may need to be achieved by at least an amount of control information that keeps the DCI short. Even during the first supplemental PUCCH resource, either the WTRU may not be able to send the aggregated HARQ feedback (e.g., due to LBT failure) or the gNB may not detect the codebook successfully, after which the gNB may give another chance to the WTRU by assigning a second supplemental PUCCH resource, but until the time of the supplemental resource the gNB may schedule another set of PDSCH resources for the WTRU (i.e., the third set of PDSCH resources). The WTRU may now be expected to aggregate the HARQ feedback across all three sets of PDSCH resources and transmit them during the second supplemental PUCCH resource. This situation may continue until some point there is no opportunity to schedule for the aggregated HARQ codebooks during the same COT, which means they may be postponed to the next COT. Also, in situations where the gNB sends a supplementary transmission opportunity, it may cause a misalignment between the expected codebook size by the gNB and the actual one sent by the WTRU.

In order to resolve this, an additional field in DCI may indicate to the WTRU that the upcoming PUCCH is a "supplementary transmission" and allow the WTRU to calculate the codebook size as it did in the previous PUCCH transmission. An Extended Downlink Assignment Indicator (EDAI) may be an additional field for NR-U situations described herein. This field in the DCI may carry the attributes of the scheduled PUCCH. This field may take care of a set or group of PDSCH resources that have a consecutive Downlink Assignment Indicator (DAI) and label them as a group. The EDAI field may have a value of 0 if the WTRU is expected to form the HARQ codebook for the TBs within the current set or group of PDSCH resources. The EDAI field may have a value of 1 if the WTRU is expected to form the HARQ codebook for the TBs within the current set or group of PDSCH resources as well as the TBs within the immediately preceding set or group of PDSCH resources. The EDAI field may have a value of 2 if the WTRU is expected to form the HARQ codebook for the TBs within the current set or group of PDSCH resources as well as the TBs within two immediately preceding sets or groups of PDSCH resources. The EDAI field may have a value of 3 if the WTRU is expected to form the HARQ codebook for the TBs within the current set or group of PDSCH resources as well as the TBs within three immediately preceding sets or groups of PDSCH resources. It follows then that the EDAI field may have a value Y if the WTRU is expected to form the HARQ codebook for the TBs within the current set or group of PDSCH resources as well as the TBs within Y immediately preceding sets or groups of PDSCH resources. As discussed herein, this general rule may be applicable to other situations where some other unit of time or group is substituted for TB such that the EDAI field's value may be relative to a current set of time/group and any previous set of time/group (e.g., transmission, COT, etc.). With this mechanism, a single DCI may request the HARQ ACK feedback for all the PDSCHs that may be transmitted in one or more PDSCH groups in the same PUCCH.

When the EDAI is nonzero and the WTRU attempts to aggregate two or more previously prepared HARQ codebooks with a current codebook, the WTRU may insert a field between the bit-stream of one codebook and the next one so that the gNB can distinguish and parse the codebooks; this field may be denoted as HARQ-codebook-delimiter with a specified bit width (e.g., 2 or 4). When aggregating multiple HARQ codebooks, a WTRU may insert the HARQ-codebook-delimiter after each HARQ codebook. In one example, if a WTRU has received consecutive PDCCH with EDAI attributes that do not have consecutive values, the WTRU may infer it has not detected one or more sets of PDCCHs leading to non-consecutive EDAI values. In such a case, the WTRU may insert one HARQ-codebook-delimiter for each missing EDAI value. For instance, consider that the WTRU receives a set of PDCCH with value EDAI=0, and then in the next set of slots or even the next COT(s), the WTRU receives a set of PDCCH with value EDAI=2. This may indicate that the WTRU has missed one or more PDCCH with EDAI=1, hence the WTRU may not know how many TBs were transmitted during the PDCCH(s) with EDAI=1. Therefore, when the WTRU aggregates the codebooks of the first received set of PDCCH(s) with EDAI=0 and the second received set of PDCCH(s) with EDAI=2, the WTRU may insert an additional HARQ-codebook-delimiter for the missing set of PDCCH(s) with EDAI=1. To further demonstrate this, the WTRU may aggregate the HARQ codebooks as follows: HARQ-codebook-EDAI0, HARQ-codebook-delimiter, HARQ-codebook-delimiter, HARQ-codebook-EDAI2. In this example, a PDSCH group (e.g. the PDSCHs in a COT) is dynamically labeled with each EDAI index. In this example, the HARQ-codebook for each group, indexed by the EDAI associated with the group may be accumulated within each PDSCH group. Alternatively, the HARQ codebook for each PDSCH group, indexed by the EDAI associated with the group may be accumulated across all the groups.

Figure 6:
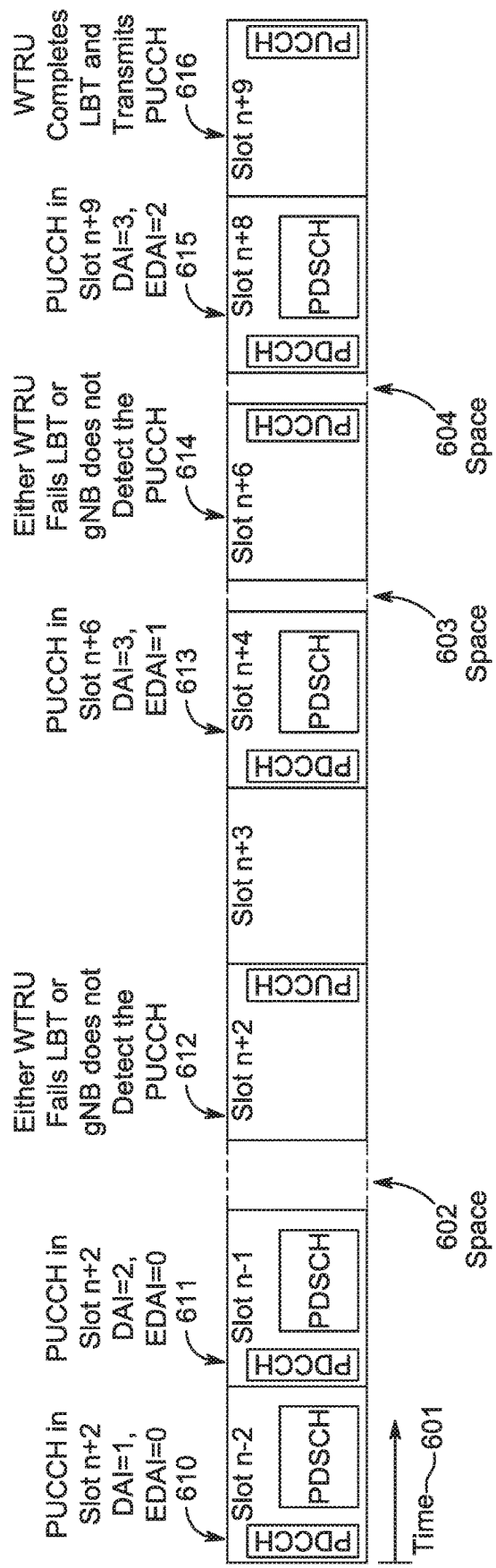
FIG. 6 is an example transmission diagram where a WTRU prepares the HARQ codebook according to at least a DAI and/or an EDAI.

FIG. 6 is an example transmission diagram where a WTRU prepares the HARQ codebook according to DAI (i.e., to calculate the codebook for the expected set of PDSCHs as a gNB expects) and according to the EDAI (i.e., to decide how many of the immediately preceding sets of HARQ codebooks should be included as well). At 610, a WTRU may receive an indication in slot n−2 for a PUCCH in slot n+2 where the DAI=1 and the EDAI=0. At 611, the WTRU may receive an indication in slot n−1 for the PUCCH in slot n+2 where the DAI=2, because the codebook will be based on the set of two PDSCHs received so far, and the EDAI=0. At 612, the WTRU will perform its scheduled LBT in slot n+2, and in this example the gNB will not receive the PUCCH, either because the LBT failed or the LBT was successful but there was interference at the receiver end. At 613, the WTRU will receive a normal resource assignment (e.g., PUCCH in n+6, and DAI=3 since this is the third PDSCH) but indicate that the EDAI=1 because the gNB did not receive the PUCCH in slot n+2, thereby indicating that the immediately preceding set of HARQ codebooks should be included as well. At 614, the gNB will not receive the PUCCH for the sake of illustration, similar to the situations at 612. As a consequence, at the next resource assignment at 615 the WTRU may receive an indication of PUCCH for slot n−9, where the DAI=3 and the EDAI=2, since the two immediate sets of codebooks should be included now. At 616 the gNB may finally receive the PUCCH after a successful LBT by the WTRU in the indicated slot n−9.

Figure 7:
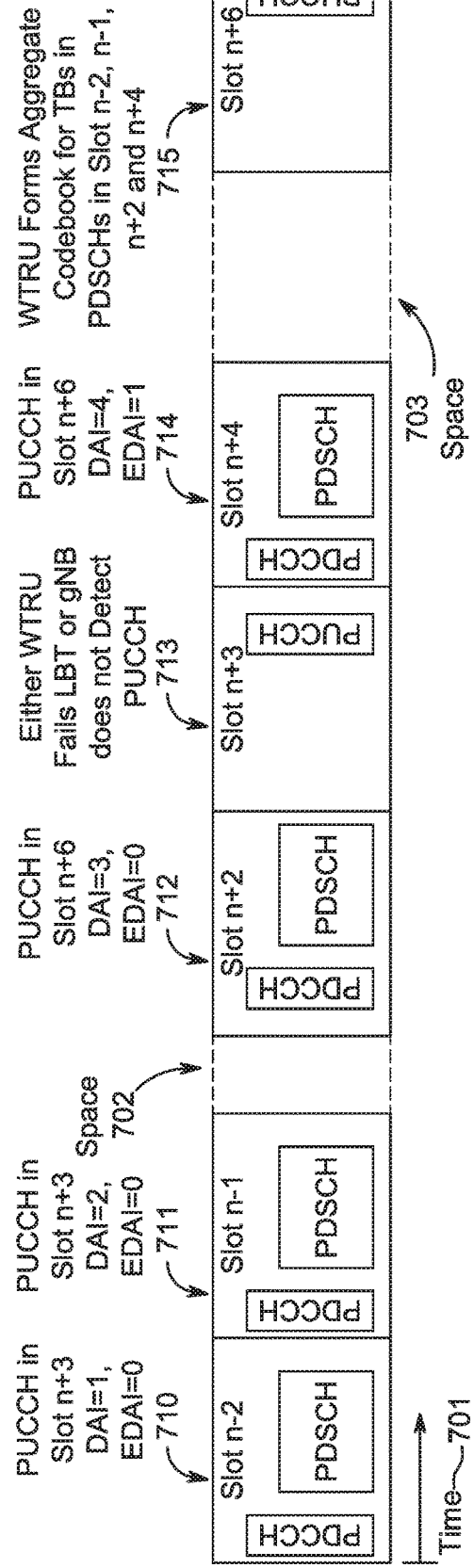
FIG. 7 is an example transmission diagram where a WTRU prepares the HARQ codebook according to at least a DAI and/or an EDAI.

FIG. 7 is an example transmission diagram where a WTRU prepares the HARQ codebook according to DAI (i.e., to calculate the codebook for the expected set of PDSCHs) and according to the last value of EDAI (i.e., to decide how many of the immediately preceding set of HARQ codebooks should be included as well). The value of EDAI may be different during a set of PDCCH resources. For instance, consider that two consecutive PDCCH resources with consecutive DAI values at 712 and 714 (e.g., in slot n+2 and n+4) indicate an upcoming PUCCH (e.g., in slot n+6) where the WTRU is expected to report the HARQ codebook of the associated PDSCH resources. Further, the PUCCH for the previous set of PDSCH resources at 710 and 711 (e.g., in slots n−2 and n−1) may be scheduled between these two PDCCH resources (e.g., at slot n+3). At 712, the value of EDAI may be 0 (e.g., in PDCCH in slot n+2), but when the gNB does not receive the expected codebook of the previous set of PDSCH at 713, then at the next the PDCCH (e.g., at slot n+4) the gNB may change EDAI to 1 at 714 and may increase the size of the PUCCH as well (i.e., it may even relocate the PUCCH resource to a later slot in order to accommodate the larger PUCCH). At 715, the WTRU may then prepare an aggregate codebook which includes the earlier HARQ codebook (e.g., the one that gNB has not received for slots n−2 and n−1) and the new HARQ codebook (e.g., for the two PDSCH resources in slot n+2 and n+4).

A WTRU may refer to the DAI value to calculate the dynamic codebook size. Due to 2-bit size of the DAI, the field may wrap around after four PDCCH/PDSCH transmissions where they all refer to an upcoming PUCCH. For instance, if five consecutive PDCCH/PDSCH transmissions all reference an upcoming PUCCH, the DAI values in the PDCCHs respectively may be "mod(dai,4), mod(dai+1,4), mod(dai+2,4), mod(dai+3,4), mod(dai,4), mod(dai+1,4)" which shows the wrap around effect. However, the wrap around may not create any error if less than four consecutive PDCCHs are missed (i.e., the WTRU would simply report NACK for the missed PDCCH resources, since both PDCCH and PDSCH are missed). Further, if a WTRU misses four or more consecutive PDCCH transmission, the WTRU may not figure out the actual number of missed PDCCH resources, which may result in a misalignment since there is no way to correctly calculate the codebook size. Missing 4 or more consecutive PDSCH on a licensed carrier may be unlikely, but it may more likely to happen in NR-U due to collisions/interference at the WTRU side. This may be addressed by increasing the DAI size to greater than 2-bit (e.g., 3 or 4 bit) so that the likelihood to miss 8 or 16 consecutive PDCCH would decrease (i.e., accommodating the possibility of missing more than 4 PDCCHs) in the case a DAI is accumulated within each group independently. In the case that a DAI is accumulated across multiple PDSCH groups indexed by an EDAI, the dynamic codebook size may be a multiple of the number of PDCCH/PDSCH transmissions per group (N) (i.e., N×(3 or 4 bits)).

Figure 8:
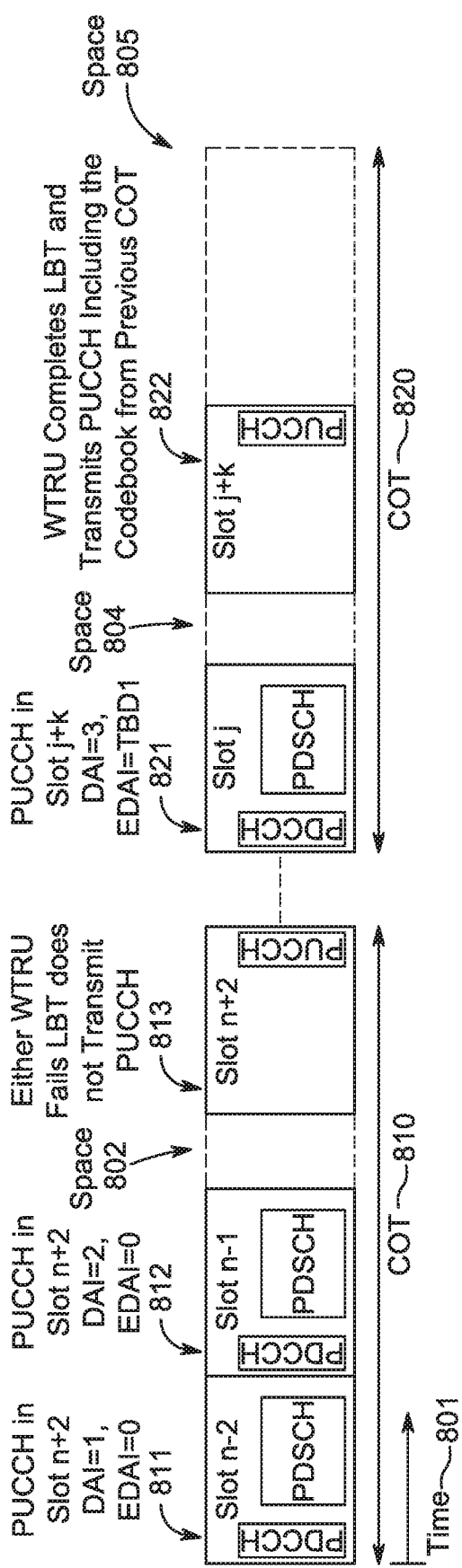
FIG. 8 is an example transmission diagram where a WTRU aggregates the HARQ codebook based on an EDAI for one or more COTs.

FIG. 8 is an example transmission diagram where a WTRU aggregates the HARQ codebook based on an EDAI for one or more COTs. Here, a WTRU may aggregate the HARQ codebook from an earlier COT (i.e., in this example the immediately previous COT) if the EDAI field indicates to do so (i.e., EDAI=TBD1). As shown there may be two COTs 810 and 820. COT 810 may be in increments of slots relative to n, and COT 820 may be in increments of slots relative to j (e.g., n=j). Generally, there may be more than two COTs, but as shown COT 820 follows COT 820. At 811 (i.e., slot n−2), the WTRU receives an indication of a PUCCH for slot n+2, with a DAI=1 and EDAI=0. At 812 (i.e., slot n−1), the WTRU may be indicated a PUCCH in slot n+2 with a DAI=2 and an EDAI=0.

At 813, a WTRU may be expected to transmit a HARQ ACK into the indicated PUCCH resource right at the end of the COT 810 (i.e., slot n+2), but the LBT may be unsuccessful (e.g., failed LBT or gNB failed to receive) and the COT 810 ends without the WTRU transmitting. The gNB and WTRU may not know when the next opportunity for PUCCH transmission will be. To address this, at 821 (i.e., slot j) the gNB may send a PDCCH to the WTRU in the next COT 820 with an indication (e.g., in a DCI or RRC) of EDAI=TBD1 indicating to the WTRU to send a PUCCH in slot j+k with the HARQ codebook, or an aggregated HARQ codebook, that was not transmitted during the last PUCCH opportunity in the earlier COT 810. The EDAI may indicate a specific PDSCH group or a specific COT, such as the group of PDSCHs that was unable to transmit a PUCCH in the previous COT. At 822, the WTRU may complete a LBT successfully for the PUCCH (e.g., indicated by DCI or RRC configured) and aggregate and send the HARQ ACK from the previous and the current COT to the gNB. While this example only discusses two COTs, the same techniques may be used for one or more COTs.

Generally, if a WTRU fails LBT and refrains from transmitting PUCCH, the WTRU may keep the HARQ codebook until the next COT and if the WTRU receives a PDCCH with EDAI=TBD1, the WTRU may do one of the following: 1) if the DCI only indicates an upcoming PUCCH, without any PDSCH, then the WTRU may transmit the codebook in the indicated upcoming PUCCH resource; or, 2) if the DCI indicates an upcoming PUCCH along with a PDSCH resource then the WTRU may aggregate the earlier codebook along with any new HARQ codebook and transmit the aggregated result in the indicated upcoming PUCCH resource. Even if a WTRU completes an LBT procedure successfully and transmits the PUCCH, the WTRU may keep the HARQ codebook until the next COT and/or until the WTRU receives a PDCCH with a value less than EDAI=TBD1 (e.g. with EDAI=0), after which the WTRU may discard the previous HARQ codebook.

The TBD1 value may be, for example, 3 if the EDAI has bit width of 2, or the TBD1 value may be 7 if the EDAI has bit width of 3. Or TBD1 may be 1, where such a value in the first unicast PDCCH to a WTRU in a new COT has the same interpretation as described above. As discussed herein, the EDAI value shown and used with regard to the example of FIG. 8 is representative of a value that functions as an indication to the WTRU to aggregate all pending HARQ codebooks for some group/time (e.g., TB, COT, etc.) up until the next uplink opportunity, and the value may be one or more numbers, letters, and/or symbols that may convey this meaning.

In one scenario there may be two consecutive COTs where a gNB has sent TBs to a WTRU, and the WTRU has failed LBT during the scheduled PUCCH opportunities or the gNB has failed to detect the PUCCH correctly, which may lead to two sets of pending HARQ codebooks at the WTRU side. Further, if within a received DCI the field EDAI has a value of TBD2 it may then indicate that the WTRU should aggregate the HARQ codebook of the current COT, if any, with the pending HARQ codebooks (e.g., that each were prepared during the two immediately previous COTs) in the scheduled PUCCH resource indicated in the same DCI with the EDAI=TBD2. In other scenarios, any EDAI value of TBD #, the # maybe indicate a numeric value associated with the number of COTs (e.g., counting the current and/or any previous COTs to arrive at the numeric value). The EDAI value of TBD # may indicate a numeric value associated with a specific COT.

In some situations, when a WTRU sends a HARQ codebook in a scheduled PUCCH, the WTRU may not discard the HARQ codebook unless the attributes of the next scheduled PUCCH has EDAI=0. This may help the WTRU to ensure that the gNB has correctly decoded the previously sent PUCCH and there may not be a need to retransmit the HARQ codebook again.

Figure 9:
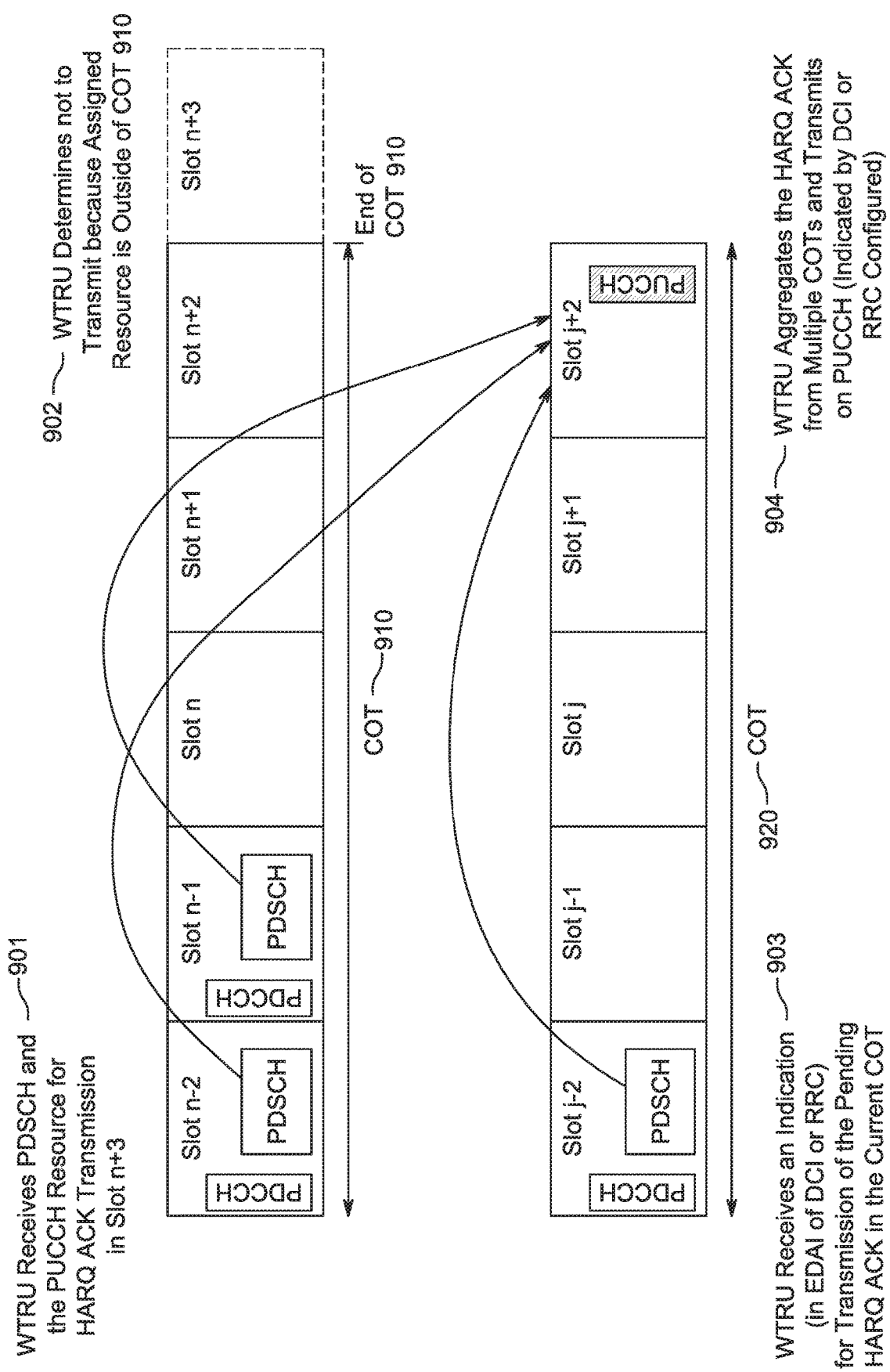
FIG. 9 is an example transmission diagram where a PUCCH resource assignment is outside of a COT and the PUCCH from a later COT is used.

FIG. 9 is an example transmission diagram where a PUCCH resource assignment is outside of a current COT and the PUCCH from a later COT is used. In this example, there may be two COTs 910 and 920. At 901, the gNB may schedule a PUCCH at a theoretical slot n+3, which may be outside of the current COT 910. A WTRU may infer that the scheduled PUCCH is outside of the current COT 910 if the PDSCH-to-HARQ-timing-indicator field in the PDCCH indicates a timing instance that is outside of the determined end time of the current COT. At 902, if a WTRU determines out that the scheduled PUCCH falls after the end of the current COT the WTRU may not proceed with PUCCH transmission and may keep the pending HARQ codebook for an upcoming transmission. In a subsequent COT 920 established by the gNB, when the WTRU receives a new PDCCH with an EDAI (e.g., indicated in a DCI or RRC) with attributes of a scheduled PUCCH for slot j+2 of COT 920. At 904, the WTRU may send the pending HARQ codebook along with any new codebook in the newly scheduled PUCCH (i.e., aggregated HARQ ACK). Within the first PDCCH/DCI in the new COT, the gNB may set EDAI=TBD1, similar to the example if FIG. 8, to indicate to the WTRU that the pending HARQ codebook is expected to be transmitted along with any newly-formed HARQ codebook. Note the arrows show that the HARQ ACK for each of the PDSCH are being sent in slot j+2. Not shown, if the WTRU does not receive a new PDCCH in a subsequent COT for a corresponding PDSCH reception in the current COT, the WTRU may transmit the associated HARQ codebook in a PUCCH resource provided by a higher layer.

In some instances, if a WTRU detects a PDCCH in the current COT but the DCI does not include a PDSCH-to-HARQ-timing-indicator field, the WTRU may assume that the gNB has not allocated a PUCCH resource to the WTRU for the corresponding PDSCH reception in the current COT. Accordingly, the WTRU may transmit the pending HARQ codebook on a PUCCH resource in a subsequent COT similar to the examples of FIGS. 8 and 9. In this case, assuming the WTRU receives a PDSCH in a slot n within the current COT, the WTRU may determine the PUCCH resource within slot n+K in the subsequent COT, where k is a number of slots provided by higher layers or the PDSCH-to-HARQ-timing-indicator field in a DCI received in a subsequent COT.

In some cases, if a WTRU finds out that the scheduled PUCCH falls after the end of the current COT, the WTRU may transmit the PUCCH after the COT has ended after performing an appropriate LBT process. Even though the COT duration has expired, the WTRU may still transmit its PUCCH as any device in an unlicensed channel does (e.g., but not beholden to a COT), however, the WTRU will have to perform an LBT process whose category depends on how long the scheduled PUCCH is after the end of the COT. If the scheduled PUCCH is within 16 μs of the end of the COT, then the WTRU may transmit the PUCCH with Cat-1 LBT which may be considered to be similar to no-LBT. If the scheduled PUCCH is within 25 μs of the end of the COT, then the WTRU may transmit the PUCCH with Cat-2 LBT which may be called one-shot LBT. If the scheduled PUCCH is after 25 μs of the end of the COT, then the WTRU may transmit the PUCCH with Cat-3 LBT and the WTRU may use the highest priority class to calculate the listen interval. If the scheduled PUCCH is after 25 μs of the end of the COT and the WTRU intends to transmit TBs within the configured grant resources after the PUCCH transmission, then the WTRU may transmit the PUCCH with Cat-4 LBT. In the above cases, the WTRU may keep the HARQ codebook until the next established COT by the gNB, since the gNB may require the WTRU to retransmit the HARQ codebook (i.e., by setting EDAI=TBD1).

As discussed herein, for successful operation in NR-U LBT procedures, LBT may be effective approach for inter-RAT and intra-RAT coexistence. However, the listen interval in an LBT may be wasted bandwidth resource and the more often LBT procedures are invoked the less efficient channel access may become. Therefore, it may be beneficial to have one switch time from DL to UL in a COT so that an LBT procedure may be invoked once. A gNB may be able to schedule DL/UL for a WTRU in a COT with a single switch point, where there is no gap or a very small gap. Regulations may help with this if there is an LBT rule of a gap less than 16 μs, which may be captured in LBT Category-1, and where a responding device (e.g., a WTRU) does not have to perform any listen interval if the gap is less than 16 μs. For instance, some 802.11 technologies may take advantage of this and a responding station may send an acknowledgment response to a frame right at the 16 μs duration. Accordingly, the NR-U frame structure may be adapted for these efficient coexistence situations with no-LBT in a COT where a gNB may address more than one WTRU within a COT.

As a reference, switching gap (from DL to UL) may be scheduled and indicated within SFI as follows "DL (WTRU1), DL(WTRU2), LBT, UL(WTRU1), DL(WTRU3), LBT, UL(WTRU2), DL(WTRU1), . . . " where the switching gap may be one OFDM symbol, and the duration of the gap may be larger than 16 μs depending on the numerology. In such a case, the WTRU may need to do other than Cat-1 LBT (e.g., if the duration is less than 25 μs then the WTRU may perform Cat-2 LBT). However, performing LBT may mean that the WTRU has to be in receive mode, although its limited portions of baseband units are used, and that means by the time that WTRU successfully completes LBT, there may need to be some switching time for the WTRU to switch to transmit mode.

In one scenario, a gNB may schedule multiple WTRUs in a manner that does not require a DL/UL switching gap. This may be a matter of scheduling for the gNB such that the DL symbols are addressed to a first WTRU and the next UL symbols are for a second WTRU. For instance, the scheduling may be DL(WTRU1), DL(WTRU2), UL(WTRU1), DL(WTRU3), UL(WTRU2), DL(WTRU1), . . . In this example, WTRU1 is notified about its upcoming UL transmission and also notified to prepare for UL transmission without a gap.

Generally, for these examples relating to a switching UL/DL, the slot boundary may be intentionally ignored, however, it may be understood that the UL symbols may be located at the last few symbols of a slot. Also, the DL and UL portions may be of different sizes. Further, the notation DL(WTRU1) may indicate one or more DL symbols, such as at the beginning of a slot for a first WTRU (i.e., WTRU1), which may carry PDCCH and/or PDSCH resources.

FIG. 10 is an example transmission diagram where a WTRU inspects the attributes of the scheduled PUCCH resource and if the no-LBT-PUCCH has a true value, the WTRU will not perform any listen interval right before the PUCCH (i.e., no gap). At 1011, a WTRU may inspect the attributes of the scheduled PUCCH resource in the DCI in a PDCCH with matching RNTI; here the gNB may indicate to the WTRU a PUCCH in slot n+3, DAI=0, and no-LBT-PUCCH=True. At 1012, the gNB may indicate to the WTRU a PUCCH in slot n+3, DAI=1, and no-LBT-PUCCH=True. If the no-LBT-PUCCH has a true value, then the WTRU may infer that for the upcoming PUCCH (i.e., slot n+3), with the associated time and frequency attributes, there may be no gap right before the PUCCH UL transmission, hence the WTRU may need not perform any listen interval right before the PUCCH as shown at 1013. The gNB may schedule the DL symbols preceding the PUCCH resource in such a way that no DL channel is addressed to the WTRU.

Also at 1013, if a WTRU finds a scheduled PUCCH resource in a DCI in a PDCCH with matching RNTI where no-LBT-PUCCH subfield has the true value, the WTRU may temporarily overwrite the value of the latest SFI (e.g., only for the slot that the PUCCH is located in) and choose one or more OFDM symbols before the scheduled PUCCH as 'X' symbols during which the WTRU transitions from downlink reception to UL transmission. The WTRU may overwrite the latest SFI value in determining the 'X' symbols so that the gNB may engage in a dynamic behavior to schedule PUCCH resources for WTRUs that takes advantage of the Cat-1 LBT (e.g., or no LBT during 16 μs period).

In another scenario, the gNB may provide a gap interval that is enough for the WTRU to perform a 25 μs LBT procedure (e.g., one-shot LBT) and to switch from DL to UL symbols. The scheduling may be "DL(WTRU1), DL(WTRU1), DL(WTRU1), DL(WTRU1), LBT, UL(WTRU1), . . . " where the LBT duration is over one or two OFDM symbols, depending on numerology. The WTRU may inspect the attributes of the scheduled PUCCH resource in the DCI in a PDCCH with matching RNTI. If the one-shot-LBT-PUCCH has a TBD3 value, then the WTRU may infer that for the upcoming PUCCH (i.e., with the associated time and frequency attributes) there may be a gap of one or more symbols right before the PUCCH UL transmission, hence the WTRU may need to perform a 25 μs listen interval right before the PUCCH and right after it may prepare to switch if the LBT succeeds. If a WTRU finds a scheduled PUCCH resource in a DCI in a PDCCH with matching RNTI where the no-LBT-PUCCH subfield has value TBD3, the WTRU may temporarily overwrite the value of the latest SFI (e.g., only for the slot that PUCCH is located in) and choose one or more OFDM symbols before the scheduled PUCCH as 'X' symbols (see Table 3 for example D/X/U symbols) during which the WTRU may transition from downlink reception to UL transmission. However, the transition may be conditioned on a successful one-shot LBT during a 25 μs interval that is right before the transition.

In a configured grant (CG), or grant free, transmission in NR, a WTRU may be configured to transmit a TB with up to K=(1,2,4,8) repetitions in a sequence of (i.e., RRC-configured) grant-free resources. There may be similar or same grant-free procedure in NR-U, where some WTRU behaviors regarding channel access and the related LBT procedure need to be adapted. When a gNB has established a COT with several grant-free resources, a WTRU may start a grant-free transmission within the gNB-established COT. For the grant-free resources within the COT, a WTRU may perform an LBT procedure in order to access the resources.

In an example, the WTRU may perform an LBT procedure (e.g., LBT Cat-2, 3 or 4) once, for instance right before the first grant-free resource the WTRU attempts to access, and then, if the LBT procedure is successful, the WTRU may access the remaining grant-free resources within the COT with either no LBT (i.e. LBT Cat-1) or with one-shot LBT (LBT Cat-2), or with LBT Cat-3. Depending on the value of K, the WTRU may reach the end of the COT without completing the K repetitions of the TB (i.e., as specified in K-repetition grant-free UL transmission).

In an example, the WTRU may perform a more robust LBT Cat-4 before accessing the first grant-free resource outside of the COT, and for accessing the subsequent grant-free resources outside of the COT the WTRU may perform no-LBT or Cat-1.

In an example, the WTRU may perform LBT Cat-3 before accessing the first grant-free resource outside of the COT, and for accessing the subsequent grant-free resources outside of the COT the WTRU may perform no-LBT or one-shot LBT.

In an example, a WTRU may be configured or may be indicated by the gNB such that the WTRU performs a one-shot LBT procedure (Cat-1) before accessing the first and each subsequent grant-free resource outside of the COT.

In an example, the WTRU may refrain from transmission on the resources outside of the COT.

As discussed herein, there may be circumstances in a NR-U transmission where a WTRU may need to transmit outside of the original COT and more than one COT may be needed. If there is more than one COT, a WTRU may need to send an acknowledgement in another COT and adjust the contention window.

A transmission of acknowledgement may be delayed to a separate COT, for example, because the data transmission is in COT1 and an acknowledgement transmission may be in COT2. In this case, the acknowledgement transmission may follow a successful LBT. In one instance, the reception of a HARQ codebook may require an acknowledgement as well, such as where a WTRU performs LBT and transmits UL acknowledgement in an UL slot. The gNB may need to confirm the reception of the acknowledgment in a following DL time slot. In this way, the WTRU may know whether the transmission is successful and thus the WTRU may adjust its contention window for next LBT accordingly.

In an example for having the ACK in a separate COT, the UL acknowledgement transmission from a WTRU may be polling based. To improve the efficiency, a group polling mechanism may be used.

In an example for having the ACK in a separate COT, a gNB may perform LBT to acquire a channel, then the gNB may transmit a group common DCI to one or more WTRUs for acknowledgement polling. A set of frequency/time resources may be allocated for the acknowledgement transmissions from multiple WTRUs. The WTRUs which may receive the group common DCI and have UL acknowledgement(s) to transmit, and may use the allocated frequency/time resources to transmit the acknowledgement. A WTRU may perform LBT with fixed duration before its UL transmission, or a WTRU may not need to perform LBT and just transmit in the allocated resource. In one instance, a WTRU may randomly choose one or more resources to transmit.

In an example for having the ACK in a separate COT, a gNB may perform LBT to acquire the channel, then the gNB may transmit a group of DCIs to a group of WTRUs for acknowledgement polling. A set of frequency/time resources may be allocated for the acknowledgement transmissions from multiple WTRUs. The WTRUs may receive the group common DCI and have UL acknowledgement(s) to transmit, and may use the allocated frequency/time resources to transmit the acknowledgement. In one instance, a WTRU may randomly choose one or more resources to transmit.

Figure 11:
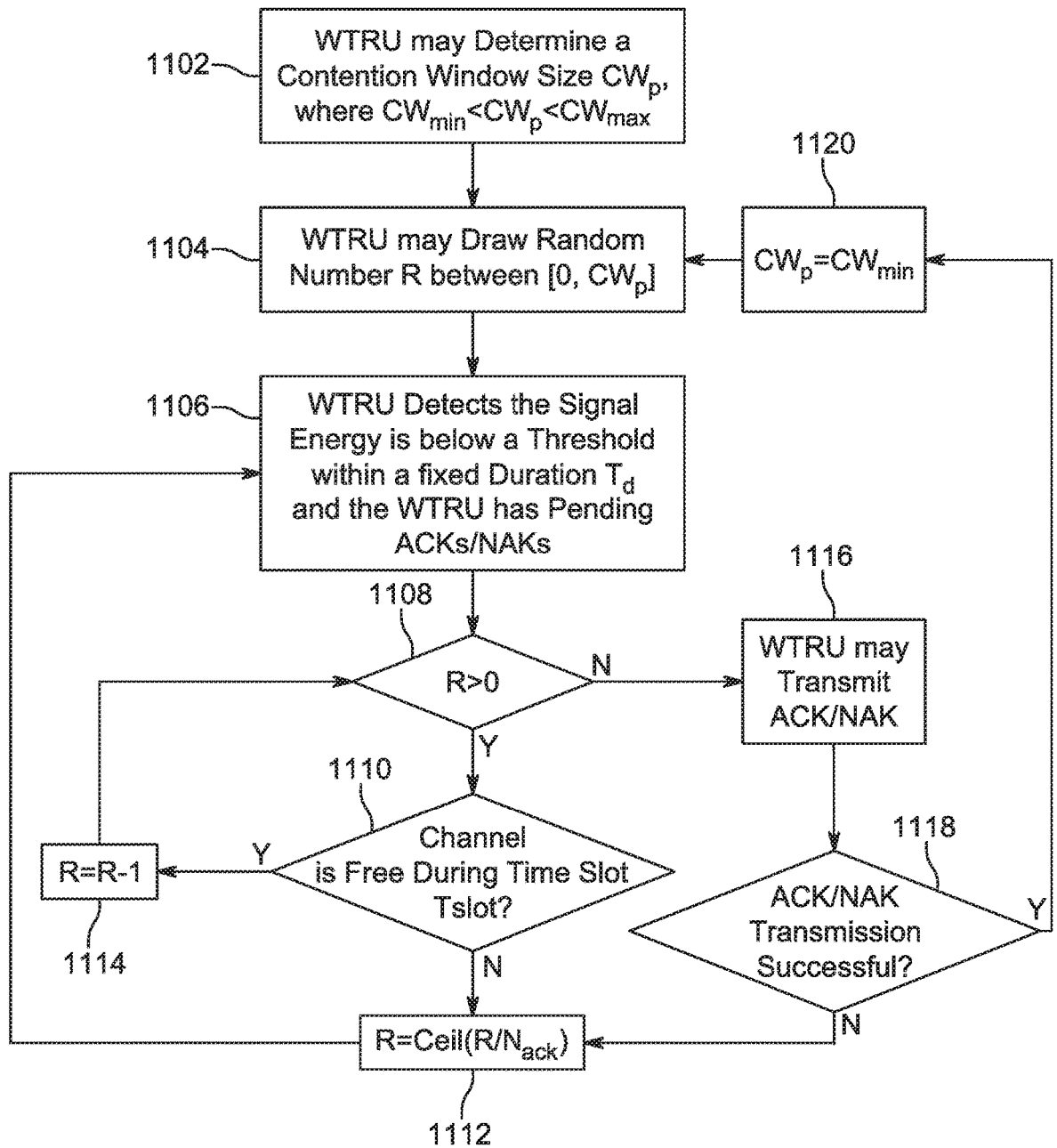
FIG. 11 is an example procedure for contention window adjustment.

FIG. 11 is an example procedure for contention window adjustment due to an accumulated number of acknowledgements to be transmitted.

Generally, an acknowledgement transmission in NR-U may require the performance of LBT. A device may not be able to transmit due to LBT failure, or a device may transmit an acknowledgement but the transmission may fail due to collision. In such a case, the device may wait for the media/channel to be available again and perform LBT. With a failed transmission, a device may need to increase the contention window size so that a larger random back off value may be drawn. However, a delayed acknowledgement transmission may introduce a delayed data transmission and create a congested channel. To address this, a device may reduce the contention window size or reduce the residual back-off duration if there are accumulated acknowledgements. In this case, a device may have a separate random back off procedure for an acknowledgement transmission.

As shown in FIG. 11, at 1102 a WTRU may determine a contention window size CWp, where $CW_{min} \le CW_p \le CW_{max}$, and $CW_{min}$ and $CW_{max}$ may be predefined/predetermined or signaled. At 1104, the WTRU may draw a random back off number for acknowledgement transmission, $R \in [0, CW_p]$. At 1106, the WTRU may detect that the signal energy level is below a predefined threshold within a fixed duration, and the WTRU may have pending ACKs/NACKs. At 1108, the WTRU may check whether R>0.

If R is greater than zero, then at 1110 the WTRU may continue monitor the channel/media for T time slot. If the channel is free during the time slot, then at 1114 the WTRU may set R=R−1. If not, then at 1112 the WTRU may check the number of accumulated acknowledgements to be transmitted $N_{ack}$, and the WTRU may set $R=f(R, N_{ack})$. The function $f$ may be predefined or predetermined. In one example, $$f(R, N_{ack}) = ceil\left(\frac{R}{N_{ack}}\right).$$

The WTRU may hold the updated R value and continue monitoring the channel.

If R is not greater than zero (i.e., R reaches 0), then at 1116 the WTRU may transmit ACKs/NACKs to the gNB. At 1118, the WTRU may know/determine whether the transmitted ACKs/NACKs are successful. If it is successful, then at 1020 the WTRU may set $CW_p = CW_{min}$ and draw a new random back off number for next ACK/NAK transmission at 1104. If the transmission of ACKs/NACKs is not successful, then at 1112 the WTRU may adjust the residual random back off value R. The WTRU may set $R=f(R, N_{ack})$.

In the example procedure of FIG. 11, the WTRU may have $N_{ack}$ saved for an accumulated number of acknowledgements. The way to maintain $N_{ack}$ at the WTRU side may be implementation related. For example, once the WTRU receives a valid DCI corresponding to a PDSCH transmission to the WTRU, the WTRU may increase the number of $N_{ack}$ by 1. Once the WTRU notices the previous acknowledgement transmission is successful, the WTRU may reset the value $N_{ack}$. For example, the WTRU may set $N_{ack} = N_{ack} - N_{ack}^{r0}$, where $N_{ack}^{r0}$ may be the number of acknowledgements previously successfully transmitted.

As discussed herein, in a NR-U transmission a WTRU or gNB may continue to transmit in an unlicensed channel, for a maximum duration, after a successful LBT procedure is performed. In some cases, it may be necessary to share a COT. When a device, such as a WTRU or gNB, starts a COT in an unlicensed channel it may also be possible to share the COT with another device, such as a gNB or WTRU respectively, where the second device transmits during the COT. For example, if a gNB starts and "owns" a COT (i.e., a gNB-owned COT), it may share it with one or more WTRUs, or if a WTRU starts and "owns" a COT (i.e., WTRU-owned COT), it may share it with its gNB. COT sharing may be limited to some rules for better coexistence as well as more efficient transmission and reception in the unlicensed channel. Using COT sharing in NR-U may enable better coexistence as well as more efficient transmission and reception in the unlicensed channel.

In a configured grant (CG) or grant-free transmission, a WTRU may perform an LBT procedure (e.g., LBT CAT-3 or CAT-4), and establish a COT where the LBT procedure is associated with a priority class. The WTRU may transmit its pending TB(s) using CG transmission rules to its gNB. Then the WTRU may share its COT, its WTRU-owned COT, with the gNB. The gNB may use the shared COT for several purposes. For example, the gNB may send CG-DFI to the WTRU that carries the HARQ feedback for the immediately previous TB(s) transmission, or TB(s) transmission that are prior to establishing the COT. The gNB may also transmit TB(s) to the same WTRU or other WTRU(s).

For more efficient COT sharing, the WTRU may indicate to the gNB the attributes of the COT. These attributes may be sent by the WTRU to the gNB in the last, or last few, CG PUCCH transmissions, possibly carried in CG-UCI. The COT attributes to be carried in the CG-UCI may contain the following: duration of the COT (e.g., a breakdown of the duration such as the total duration, the duration expected to be used by the WTRU who owns the COT, and/or the remainder of the COT); access category (AC) or access priority class for which the COT is established for; whether or not the gNB is allowed to use the COT for DL transmission to other WTRUs; and/or, whether or not the gNB is allowed to use the COT to schedule UL transmission for other WTRUs.

When the gNB starts transmission in a WTRU-shared COT, the gNB may announce the COT attributes to other WTRUs. The (WTRU-shared) COT attributes may be part of the COT attribute that the gNB sends at the beginning of a COT, and/or resends at the beginning of the subsequent slots of the COT). The gNB may send this at the beginning of the COT or at the beginning of the shared transmission.

COT-sharing may be performed among two or more WTRUs (e.g., where two WTRUs engage in a CG transmission to their gNB). For example, WTRU1 may start a COT and transmit its pending TB(s) in the CG PUSCH. Then WTRU2 may use the same COT to transmit its own CG PUSCH. However, WTRU2 may need to be informed about the WTRU1-owned COT. In one approach, WTRU1 may send its COT attributes to the gNB indicating that other WTRUs may use the remainder of the COT. Then the gNB announces such COT attributes with the other WTRUs in a group-common (GC) PDCCH.

A COT that is established by a WTRU may be for CG, or autonomous uplink (AUL), transmission. When this COT is shared with the gNB, the shared COT may be used between a CG (or AUL) and scheduled or grant-based UL transmission. For instance, the gNB may use the WTRU1-owned shared-COT to schedule grant-based (or scheduled UL) for WTRU2. However, for this to occur the gNB may need to be aware of the fact that WTRU2 has pending TB(s) for transmission. It some cases, the gNB may have received the WTRU's scheduling request (SR) in a prior or immediately previous COT, and/or did not have the time or scheduled resources to schedule an UL transmission for a WTRU in that COT. Alternatively, the gNB may schedule SR resources for all the WTRUs in the first or first few slots after the gNB starts using the shared-COT, where the SR resources may be used to indicate to the gNB that they have pending TB(s). After reception of a SR from a WTRU, the gNB may schedule an UL in the remainder of the shared WTRU1-owned shared-COT.

When a WTRU intends to share its owned COT with its gNB, the WTRU may perform one or more actions in order to make sure the gNB is able to start its downlink transmission within a gap that is limited by regulatory rules (e.g., where a gap may be of 25 µs duration). If the gNB starts transmission within this gap, then the COT sharing may be performed within the regulatory rules. Otherwise, if the gNB cannot start the transmission within the duration of the gap, then the gNB may have to go through a full LBT procedure (CAT3 or CAT4) before being able to transmit. In order to increase the chance of the gNB successfully using the WTRU-owned shared-COT, the WTRU may perform these one or more actions.

One such action may be where the WTRU extends the cyclic-prefix (CP) of one or a few last symbols in order to align the end of its transmission within a regulatory duration, such as 25 µs, before the start of the next slot or before the start of the next opportunity that the gNB can start a mini-slot. Note that the CP extension maybe indicated by the WTRU to the gNB ahead of time, such as in a CG-UCI.

One such action may be where the WTRU transmits sounding reference signals (SRS) in the last one or few symbols of the slot within a regulatory duration, such as 25 µs, before the start of the next slot or before the start of the next opportunity that the gNB can start a mini-slot.

In COT attributes, some measurements from the WTRU that has acquired the COT may also be reported (e.g., RSSI, Reference Signal Received Power (RSRP), etc.). COT sharing may be prioritized among a set of WTRUs and a gNB, where among them one device acts as a primary (or master) node and others are secondary (or slave) nodes.

Figure 12:
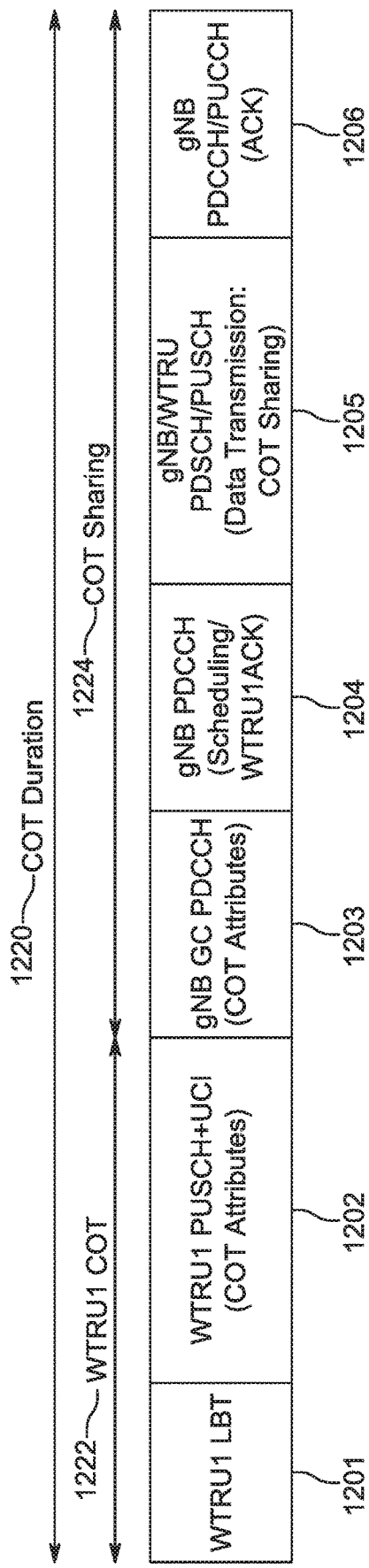
FIG. 12 is an example transmission diagram of basic COT sharing.

FIG. 12 is an example transmission diagram of basic COT sharing. Generally, basic COT sharing may be used in scenarios where the WTRU has a low traffic load, or in a less dense situation where a hidden node problem is less pronounced. In FIG. 12 and FIG. 12, each box may be representative of one or more slots. The COT duration 1220 may comprise a WTRU1 COT 1222 and a COT sharing portion 1224. Initially at 1201, the WTRU may acquire the COT (e.g., in order to transmit in the pre-configured CG/grant free resources) by performing a LBT. On the first transmission after acquisition, the WTRU may transmit the COT attributes to the gNB and other attributes related to the WTRU CG transmission at 1202. These attributes may be carried on a UCI multiplexed on the PUSCH. On completion of the PUSCH transmission, at 1203 a gNB may take over the COT (i.e., share it) where one or more of the following may happen: the gNB announces the COT attributes in a GC-PDCCH, also at 1203; the gNB transmits a PDCCH with WTRU allocation at 1204; the gNB/WTRU transmit PDSCH/PUSCH based on the PDCCH allocation at 1205; and/or the gNB/WTRU transmit PUCCH/PDSCH (i.e., for ACK) based on received PDSCH/PUSCH at 1206.

Figure 13:
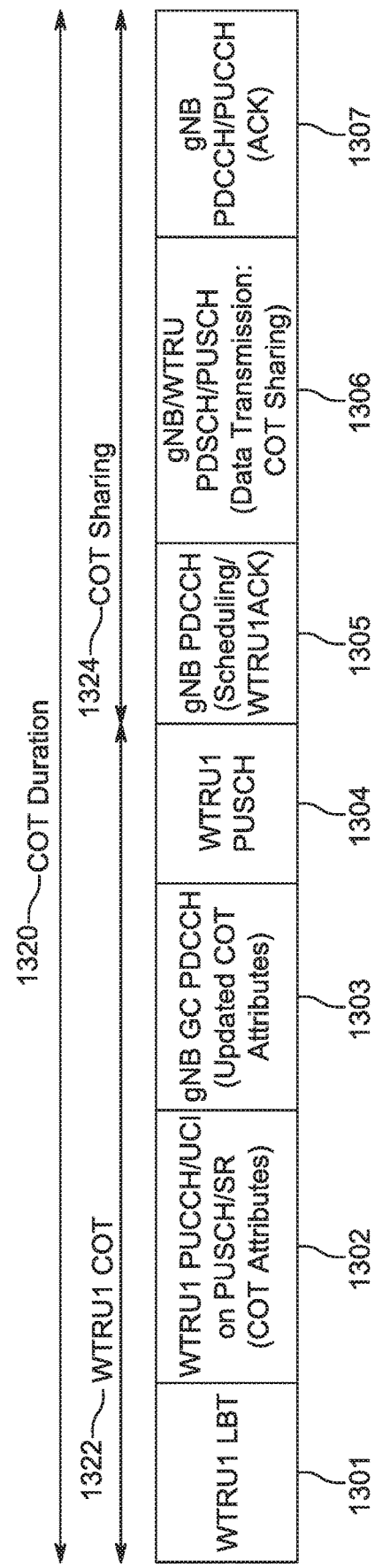
FIG. 13 is an example transmission diagram of COT sharing limiting the effect of hidden nodes.

Alternatively, a COT sharing procedure may include additional steps in order to limit the effect of hidden nodes. FIG. 13 is an example transmission diagram of COT sharing limiting the effect of hidden nodes. The COT duration 1320 may comprise a WTRU1 COT 1322 and a COT sharing portion 1324. Initially, the WTRU may acquire the COT (e.g., in order to transmit in the pre-configured CG/grant free resources) based on a LBT at 1301. On the first transmission after acquisition, at 1302 the WTRU may transmit the COT attributes to the gNB. These COT attributes may be carried by a short transport block enabling a UCI multiplexed on the PUSCH, by a short PUCCH, or by a modified SR using the UCI on the PUCCH. On receipt of the WTRU COT attributes at the gNB, the gNB may transmit the shared COT attributes at 1303, where there may be the exact COT attributes requested by the WTRU, or may be a modified set of COT attributes requested by the WTRU that includes the WTRU's reserved attributes and the additional shared COT attributes. At 1304 the WTRU may then transmit its desired data to the gNB in a PUSCH. On completion of the PUSCH transmission, the gNB may take over the COT, where the gNB may transmit a PDCCH with WTRU allocation 1305, the gNB/WTRU may transmit PDSCH/PUSCH based on the PDCCH allocation 1306, and/or the gNB/WTRU transmit PUCCH/PDSCH (for ACK) based on received PDSCH/PUSCH 1207.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit receive unit (WTRU), the method comprising:
    receiving radio resource control (RRC) information regarding parameters for performing Type 2 Hybrid Automatic Repeat Request (HARQ) feedback;
    receiving, while operating in New Radio Unlicensed (NR-U), first control information for a first physical downlink shared channel (PDSCH) transmission in a first physical downlink control channel (PDCCH) transmission, wherein the first control information includes a first HARQ feedback timing indicator;
    determining not to send hybrid automatic repeat request (HARQ) feedback for the first PDSCH transmission based on a value of the first HARQ feedback timing indicator and the RRC information;
    receiving second control information for a second PDSCH transmission in a second PDCCH transmission;
    sending a first physical uplink control channel (PUCCH) transmission that includes HARQ feedback for the second PDSCH transmission based on the second control information and the RRC information;
    receiving third control information for a third PDSCH transmission in a third PDCCH transmission, wherein the third control information includes an index indicating a PDSCH group, wherein the third control information includes downlink assignment information; and
    sending, in a NR-U channel, a second PUCCH transmission that includes aggregated HARQ feedback based on the third control information and the RRC information, wherein the HARQ feedback for the first PDSCH transmission is aggregated with a HARQ feedback for the third PDSCH transmission to create the aggregated HARQ feedback based on the index indicating the PDSCH group, the downlink assignment information, and the RRC information.

2. The method of claim 1, wherein the second control information includes a second HARQ feedback timing indicator used to send the first second PUCCH transmission.

3. The method of claim 1, wherein the HARQ feedback for the third PDSCH transmission is sent based on timing indicated by a third HARQ feedback timing indicator.

4. The method of claim 1, wherein the HARQ feedback for the third PDSCH transmission is sent on a Physical Uplink Control Channel (PUCCH) resource determined from the third control information.

5. The method of claim 1, wherein the first HARQ feedback timing indicator is a first PDSCH-to-HARQ timing indicator.

6. The method of claim 1, further comprising performing a listen-before-talk (LBT) prior to sending the first PUCCH transmission or the second PUCCH transmission.

7. The method of claim 1, wherein the value of the first HARQ feedback timing indicator is outside of a current channel occupancy time (COT).

8. A wireless transmit receive unit (WTRU), the WTRU comprising:
   a processor operatively coupled to a transceiver;
   the transceiver configured to receive radio resource control (RRC) information regarding parameters for performing Type 2 Hybrid Automatic Repeat Request (HARQ) feedback;
   the processor configured to receive, while operating in New Radio Unlicensed (NR-U), first control information for a first physical downlink shared channel (PDSCH) transmission in a first physical downlink control channel (PDCCH) transmission, wherein the first control information further includes a first HARQ feedback timing indicator;
   the processor configured to determine not to send hybrid automatic repeat request (HARQ) feedback for the first PDSCH transmission based on a value of the first HARQ feedback timing indicator and the RRC information;
   the transceiver configured to receive second control information for a second PDSCH transmission in a second PDCCH transmission;
   sending a first physical uplink control channel (PUCCH) transmission that includes HARQ feedback for the second PDSCH transmission based on the second control information and the RRC information;
   the transceiver configured to receive third control information for a third PDSCH transmission in a third PDCCH transmission, wherein the third control information includes an index indicating a PDSCH group, wherein the third control information includes downlink assignment information; and
   the transceiver configured to send a second PUCCH transmission that includes aggregated HARQ feedback based on the third control information, wherein the HARQ feedback for the first PDSCH transmission is aggregated with a HARQ feedback for the third PDSCH transmission to create the aggregated HARQ feedback based on the index indicating the PDSCH group, the downlink assignment information, and the RRC information.

9. The WTRU of claim 8, wherein the second control information includes a second HARQ feedback timing indicator used to send the first PUCCH transmission.

10. The WTRU of claim 8, where the HARQ feedback for the third PDSCH transmission is sent based on timing indicated by a third HARQ feedback timing indicator.

11. The WTRU of claim 8, wherein the HARQ feedback for the third PDSCH transmission is sent on a Physical Uplink Control Channel (PUCCH) resource determined from the third control information.

12. The WTRU of claim 8, wherein the first HARQ feedback timing indicator is a first PDSCH-to-HARQ timing indicator.

13. The WTRU of claim 8, the processor and transceiver configured to perform a listen-before-talk (LBT) prior to sending the first PUCCH transmission or the second PUCCH transmission.

14. The WTRU of claim 8, wherein the value of the first HARQ feedback timing indicator is outside of a current channel occupancy time (COT).

15. A method implemented by a wireless transmit receive unit (WTRU), the method comprising:
   receiving radio resource control (RRC) information regarding parameters for performing Type 2 Hybrid Automatic Repeat Request (HARQ) feedback;
   receiving first control information for a first physical downlink shared channel (PDSCH) transmission in a first physical downlink control channel (PDCCH) transmission, wherein the first control information further includes a first HARQ feedback timing indicator, wherein the value of the first HARQ feedback timing indicator is outside of a current channel occupancy time (COT);
   determining not to send a first hybrid automatic repeat request (HARQ) feedback for the first PDSCH transmission based on a value of the first HARQ feedback timing indicator and the RRC information;
   receiving second control information for a second PDSCH transmission in a second PDCCH transmission, wherein the second control information includes an an index indicating a PDSCH group, wherein the second control information includes downlink assignment information; and
   sending a physical uplink control channel (PUCCH) transmission that includes aggregated HARQ feedback based on the second control information, wherein the first HARQ feedback for the first PDSCH transmission is aggregated with a HARQ feedback for the second PDSCH transmission to create the aggregated HARQ feedback based on the index indicating the PDSCH group and the RRC information.

16. A wireless transmit receive unit (WTRU) comprising:
   a processor operatively coupled to a transceiver;
   the transceiver and processor configured to receive radio resource control (RRC) information regarding parameters for performing Type 2 Hybrid Automatic Repeat Request (HARQ) feedback;
   the transceiver and processor configured to receive first control information for a first physical downlink shared channel (PDSCH) transmission in a first physical downlink control channel (PDCCH) transmission, wherein the first control information further includes a first HARQ feedback timing indicator, wherein the value of the first HARQ feedback timing indicator is outside of a current channel occupancy time (COT);
   the transceiver and processor configured to determine not to send a first hybrid automatic repeat request (HARQ) feedback for the first PDSCH transmission based on a value of the first HARQ feedback timing indicator and the RRC information;
   the transceiver and processor configured to receive second control information for a second PDSCH transmission in a second PDCCH transmission, wherein the second control information includes an indication of an index indicating a PDSCH group, wherein the second control information includes downlink assignment information; and the transceiver and processor configured to send a physical uplink control channel (PUCCH) transmission that includes aggregated HARQ feedback based on the second control information, wherein the first HARQ feedback for the first PDSCH transmission is aggregated with a HARQ feedback for the second PDSCH transmission to create the aggregated HARQ feedback based on the index indicating the PDSCH group, the downlink assignment information, and the RRC information.

* * * * *